(12) United States Patent
Kuang

(10) Patent No.: US 12,304,547 B2
(45) Date of Patent: May 20, 2025

(54) FOLDABLE STROLLER

(71) Applicant: Junjie Kuang, Linwu County, Hunan Province (CN)

(72) Inventor: Junjie Kuang, Linwu County, Hunan Province (CN)

(73) Assignee: ZHONGSHAN KANGDI BABY PRODUCTS CO., LTD., Zhongshan (CN)

( * ) Notice: Subject to any disclaimer, the term of this patent is extended or adjusted under 35 U.S.C. 154(b) by 0 days.

(21) Appl. No.: 19/001,664

(22) Filed: Dec. 26, 2024

(65) Prior Publication Data

US 2025/0128750 A1 Apr. 24, 2025

Related U.S. Application Data

(63) Continuation-in-part of application No. 18/734,001, filed on Jun. 5, 2024, now Pat. No. 12,221,150.

(51) Int. Cl.
| | |
|---|---|
| B62B 7/08 | (2006.01) |
| B62B 9/08 | (2006.01) |
| B62B 9/14 | (2006.01) |
| B62B 9/20 | (2006.01) |
| B62B 9/26 | (2006.01) |

(52) U.S. Cl.
CPC ............... *B62B 7/08* (2013.01); *B62B 9/082* (2013.01); *B62B 9/087* (2013.01); *B62B 9/142* (2013.01); *B62B 9/206* (2013.01); *B62B 9/26* (2013.01)

(58) Field of Classification Search
CPC ...................................................... B62B 7/06
See application file for complete search history.

(56) References Cited

U.S. PATENT DOCUMENTS

| | | | | |
|---|---|---|---|---|
| 9,855,962 | B1 * | 1/2018 | Chen ....................... | B62B 3/025 |
| 9,896,118 | B2 * | 2/2018 | Choi ........................ | B62B 3/007 |
| 10,633,010 | B1 * | 4/2020 | Zhang ..................... | B62B 3/025 |
| 10,988,153 | B1 * | 4/2021 | Horowitz ................ | B62B 7/008 |
| 11,225,277 | B1 * | 1/2022 | Sun ......................... | B62B 5/061 |
| 11,498,601 | B2 * | 11/2022 | Zehfuss ................... | B62B 7/008 |
| 11,772,698 | B2 * | 10/2023 | Cui ......................... | B62B 7/008 |
| | | | | 280/650 |
| D1,005,177 | S * | 11/2023 | Lin .......................... | D21/425 |
| D1,018,688 | S * | 3/2024 | Wu .......................... | D34/12 |
| 11,919,557 | B2 * | 3/2024 | Pang ....................... | B62B 3/007 |
| 11,958,520 | B1 * | 4/2024 | Sun ......................... | B62B 5/067 |
| 11,981,364 | B2 * | 5/2024 | Ma .......................... | B62B 5/0461 |
| 2015/0145224 | A1 * | 5/2015 | Zhu ......................... | B62B 3/007 |
| | | | | 280/42 |

(Continued)

*Primary Examiner* — Erez Gurari

(57) ABSTRACT

A foldable stroller includes a frame and wheels installed at a bottom of the frame. The frame has a folded state and an unfolded state. The frame includes a first bracket assembly, a second bracket assembly, a connecting bracket assembly and a supporting assembly. The second bracket assembly is arranged opposite to the first bracket assembly in a front-back direction. Each of two ends of the connecting bracket assembly is connected to the first bracket assembly and the second bracket assembly respectively. A connecting end of the supporting assembly is rotatably connected to the connecting bracket assembly, a sliding end of the supporting assembly is slidably connected to either the first bracket assembly and the second bracket assembly or the connecting bracket assembly.

19 Claims, 18 Drawing Sheets

(56) References Cited

U.S. PATENT DOCUMENTS

2015/0151771 A1\* 6/2015 Jin .................. B62B 5/0013
  280/651
2018/0057035 A1\* 3/2018 Choi .................. B62B 9/26
2019/0185038 A1\* 6/2019 Choi .................. B60B 33/02

\* cited by examiner

FOLDABLE STROLLER

CROSS-REFERENCE TO RELATED APPLICATIONS

This application is a Continuation-in-Part of the U.S. application Ser. No. 18/734,001 filed on Jun. 5, 2024, and entitled "FOLDING STROLLER" now pending, the entire disclosures of which are incorporated herein by reference.

TECHNICAL FIELD

The present invention relates to the technical field of baby products, and in particular, to a foldable stroller.

BACKGROUND OF THE INVENTION

With the progress of society and the enhancement of people's living standards, outdoor recreation has become a popular and favored pastime among people, drawing the attention of a growing number of families. Parents and other guardians have a preference for accompanying infants and toddlers to enjoy outdoor activities during their spare time. The stroller, which is a children's item designed for outdoor use, not only allows infants and toddlers to sit or lie down within it, facilitating the travel with children and making it convenient for excursions, but also enables people to place some outdoor supplies in it, so that the stroller serves as a labor-saving and convenient carrying tool.

In the existing technology, strollers usually have a large number of rods, complicated folding components, and cumbersome folding operations. Moreover, it is quite easy to pinch users' fingers during the process of folding the stroller. Besides, the volume of such foldable stroller products remains relatively large after being folded, which is inconvenient for carrying. What's more, these strollers are not stable in the folded state and are prone to deformation.

Therefore, the present invention provides a foldable stroller, which can effectively solve the above problems. The foldable stroller has a simple structure, a compact volume after being folded, and excellent stability.

SUMMARY OF THE INVENTION

In order to overcome the shortcomings of the prior art, the present invention provides a foldable stroller. The foldable stroller has a simple structure, a compact volume after being folded, and excellent stability.

The technical solution adopted by the present invention to solve the technical problem is as follows.

A foldable stroller includes a frame and wheels installed at a bottom of the frame.

The frame has a folded state and an unfolded state, the frame includes
  a first bracket assembly; a second bracket assembly, wherein the second bracket assembly is arranged opposite to the first bracket assembly in a front-back direction; a connecting bracket assembly, wherein each of two ends of the connecting bracket assembly is connected to the first bracket assembly and the second bracket assembly respectively; and a supporting assembly, wherein a connecting end of the supporting assembly is rotatably connected to the connecting bracket assembly, a sliding end of the supporting assembly is slidably connected to either the first bracket assembly and the second bracket assembly or the connecting bracket assembly; when the frame changes between the folded state and the unfolded state, the connecting end of the supporting assembly rotates relative to the connecting bracket assembly, the sliding end of the supporting assembly slides along the first bracket assembly and the second bracket assembly or the sliding end of the supporting assembly slides along the connecting bracket assembly, and the connecting bracket assembly rotates relative to the first bracket assembly and the second bracket assembly.

As an improvement of the present invention, the foldable stroller further includes a locking assembly, the locking assembly is arranged at the sliding end of the supporting assembly and moves between a locked position and an unlocked position, a locking hole is arranged on the first bracket assembly and/or the second bracket assembly or on the connecting bracket assembly, and when the frame is in the unfolded state, the locking assembly moves to the locked position, at this time, the locking assembly is inserted into the locking hole.

As an improvement of the present invention, the locking assembly includes a locking block and an elastic member, the sliding end of the supporting assembly is provided with a locking block groove, the locking block is slidably arranged within the locking block groove, the elastic member is arranged within the locking block groove and abuts against the locking block, and the elastic member drives the locking block to move towards the locked position.

As an improvement of the present invention, the locking assembly further includes a driving member and a transmission rope, the driving member is arranged on one side of the connecting bracket assembly adjacent to the connecting end of the supporting assembly, one end of the transmission rope is connected to the driving member, and the other end of the transmission rope extends along a part of an inside of the supporting assembly to the sliding end of the supporting assembly and is connected to the locking block.

As an improvement of the present invention, the connecting bracket assembly includes an upper connecting bracket assembly and a lower connecting bracket assembly, each of two ends of the upper connecting bracket assembly is connected to an upper end of the first bracket assembly and an upper end of the second bracket assembly respectively, and each of two ends of the lower connecting bracket assembly is connected to a lower end of the first bracket assembly and a lower end of the second bracket assembly respectively.

As an improvement of the present invention, the upper connecting bracket assembly includes a first rod, a second rod and a third rod, a first end of the first rod is rotatably connected to the upper end of the first bracket assembly, a first end of the third rod is rotatably connected to the upper end of the second bracket assembly, and each of two ends of the second rod is rotatably connected to a second end of the first rod and a second end of the third rod respectively.

As an improvement of the present invention, the lower connecting bracket assembly includes a fourth rod, a fifth rod and a sixth rod, a first end of the fourth rod is rotatably connected to the lower end of the first bracket assembly, a first end of the sixth rod is rotatably connected to the lower end of the second bracket assembly, and each of two ends of the fifth rod is rotatably connected to a second end of the fourth rod and a second end of the sixth rod respectively.

As an improvement of the present invention, a middle part of the second rod extends downward to form a connecting rod, the driving member is in a T-shape and is provided with a sliding channel, and the connecting rod is inserted into the sliding channel, thus the driving member is able to slide along the connecting rod.

As an improvement of the present invention, the supporting assembly includes two first supporting assemblies, each of connecting ends of the two first supporting assemblies is rotatably connected to the connecting rod, and each of sliding ends of the two first supporting assemblies is slidably connected to the first bracket assembly and the second bracket assembly respectively or each of sliding ends of the two first supporting assemblies is slidably connected to the fourth rod and the sixth rod respectively.

As an improvement of the present invention, the supporting assembly further includes two second supporting assemblies, each of first ends of the two second supporting assemblies is rotatably connected to middle parts of the two first supporting assemblies respectively, and each of second ends of the two second supporting assemblies is rotatably connected to the fourth rod and the sixth rod respectively.

As an improvement of the present invention, the foldable stroller further includes a fixing member, a first end of the fixing member is connected to the first bracket assembly, a second end of the fixing member is detachably connected to the second bracket assembly, when the frame is in the folded state, the second end of the fixing member is connected to the second bracket assembly, and when the frame is in the unfolded state, the second end of the fixing member is detached from the second bracket assembly.

As an improvement of the present invention, the foldable stroller further includes a push rod assembly and a locking fastener, the push rod assembly is rotatably connected to the first bracket assembly, the locking fastener is connected to the push rod assembly and the first bracket assembly, and the locking fastener is configured to allow or prevent a relative rotation between the push rod assembly and the first bracket assembly.

As an improvement of the present invention, the wheels include a swivel caster and a fixed caster, the swivel caster is connected to a bottom of the second bracket assembly, and the fixed caster is connected to a bottom of the first bracket assembly.

As an improvement of the present invention, the foldable stroller further includes a locking member, the locking member is rotatably connected to the first bracket assembly and moves between a locked position and an unlocked position, a plurality of locking grooves are arranged on an inner side of the fixed caster, when the locking member rotates to the locked position, the locking member is inserted into the locking groove, and when the locking member rotates to the unlocked position, the locking member is detached from the locking groove.

As an improvement of the present invention, the locking member includes a pedal and a locking rod connected to an outside of the pedal, and the pedal is configured to allow users to step on or lift it up, the locking rod is inserted into or detached from the locking groove.

As an improvement of the present invention, the locking rod includes a locking portion positioned at each of two ends of the locking rod, a connecting portion positioned in middle and a curved transition portion positioned between the locking portion and the connecting portion, the pedal is connected to the connecting portion, the locking portion is inserted into or detached from the locking groove, and the transition portion extends outward in a direction away from the first bracket assembly.

As an improvement of the present invention, friction textures are arranged on an upper surface of the pedal.

As an improvement of the present invention, the foldable stroller further includes a plurality of clamping members, the clamping member is provided with an opening facing downward, the clamping member is clamped onto the upper connecting bracket assembly, and the clamping member is configured to clamp and fix a bushing onto the upper connecting bracket assembly.

As an improvement of the present invention, the foldable stroller further includes a plurality of supporting members, the supporting member is connected to an upper part of the first bracket assembly and/or an upper part of the second bracket assembly, and the supporting member is configured to support a shielding cover.

As an improvement of the present invention, the foldable stroller further includes a bearing member, the bearing member is connected to a middle part of the first bracket assembly and extends in a direction away from the first bracket assembly, and the bearing member is configured to bear and support an accommodating bushing.

Beneficial effects: Through the arrangement of the above structure, when the product is being stored, the first bracket assembly and the second bracket assembly move closer to each other. The connecting end of the supporting assembly rotates relative to the connecting bracket assembly, and the sliding end of the supporting assembly slides upward along the first bracket assembly and the second bracket assembly until the frame is in the folded position. At this time, the frame covers a small floor area and can be conveniently stored and transported. When the product is in use, the first bracket assembly and the second bracket assembly move away from each other. The connecting end of the supporting assembly rotates relative to the connecting bracket assembly, and the sliding end of the supporting assembly slides downward along the first bracket assembly and the second bracket assembly until the frame is in the unfolded position. At this time, a cuboid-like accommodating space is formed among the first bracket assembly, the second bracket assembly and the connecting bracket assembly. Meanwhile, the supporting assembly is connected to the first bracket assembly, the second bracket assembly and the connecting bracket assembly at the same time, which makes the product structure more stable and enhances the product strength.

BRIEF DESCRIPTION OF DRAWINGS

In order to explain the technical solutions of the embodiments of the present invention more clearly, the following will briefly introduce the accompanying drawings used in the embodiments. The drawings in the following description are only some embodiments of the present invention. Those of ordinary skill in the art can obtain other drawings based on these drawings without creative work.

The present invention is further described below in detail in combination with the accompanying drawings and embodiments.

DETAILED DESCRIPTION OF THE INVENTION

Embodiment I

Figure 1:
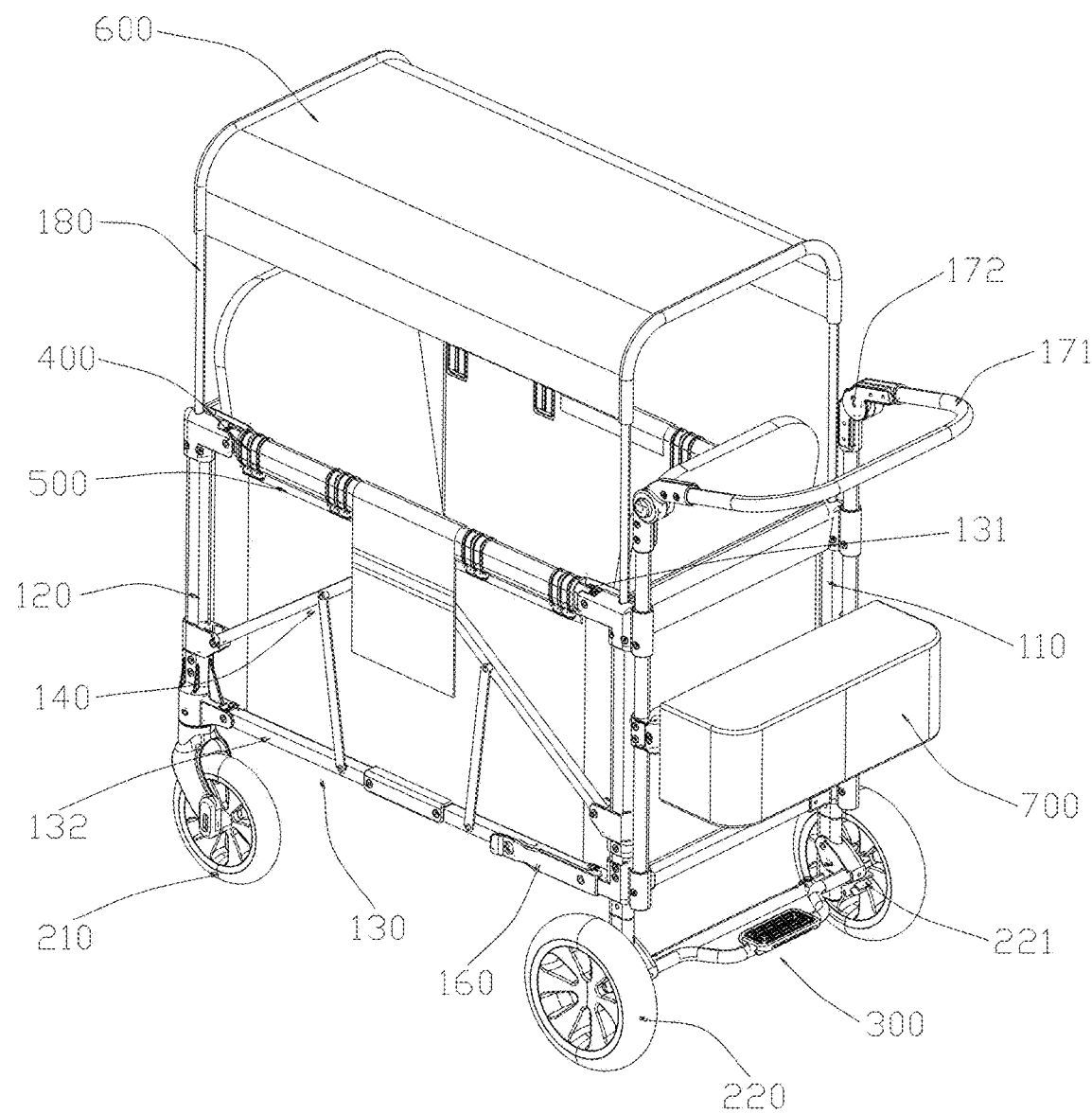
FIG. 1 is a schematic diagram of a usage state according to the present invention.
Figure 2:
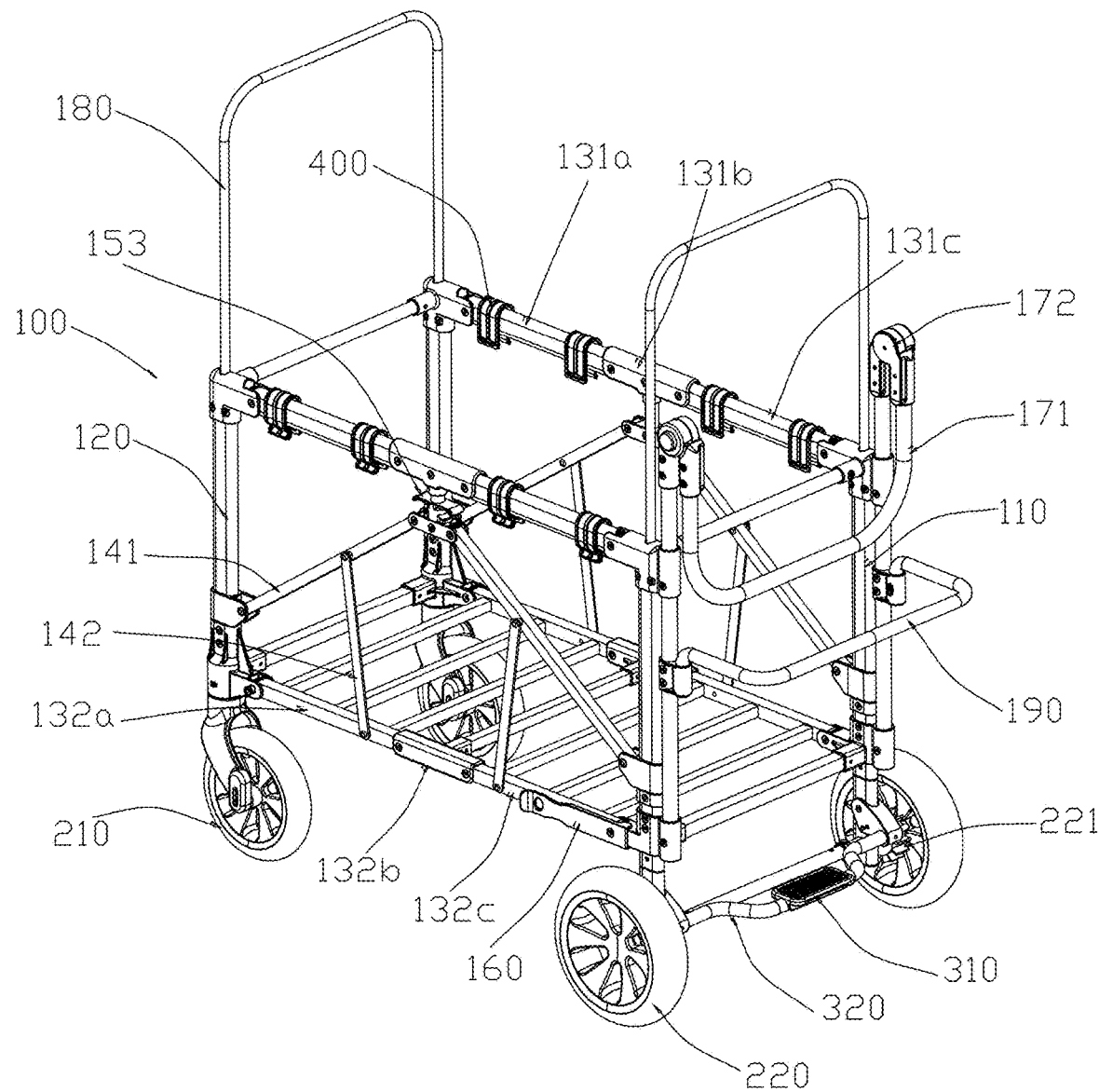
FIG. 2 is a schematic structural diagram according to Embodiment I of the present invention.
Figure 3:
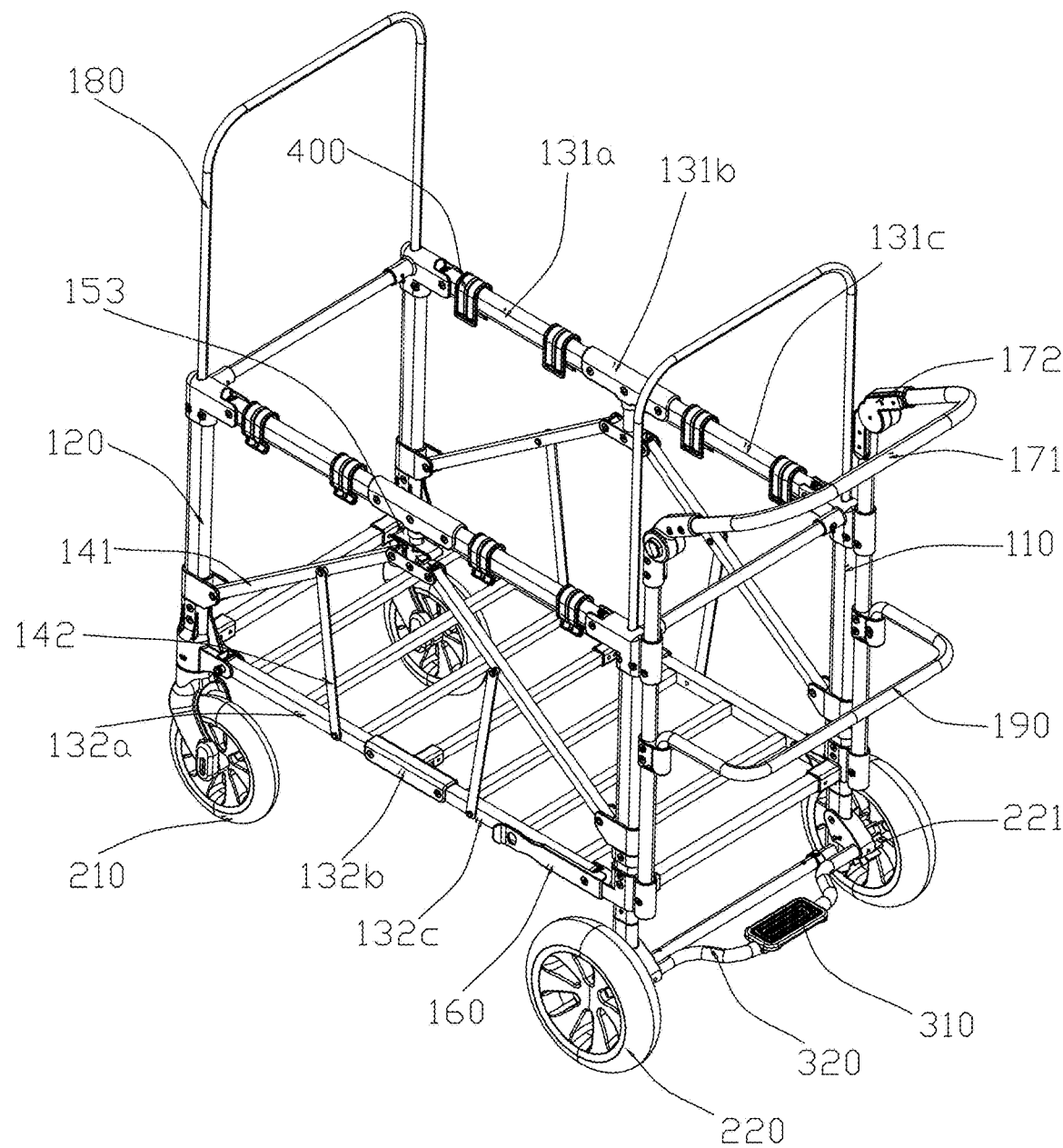
FIG. 3 is a schematic diagram of a push rod assembly in an open state according to Embodiment I of the present invention.
Figure 4:
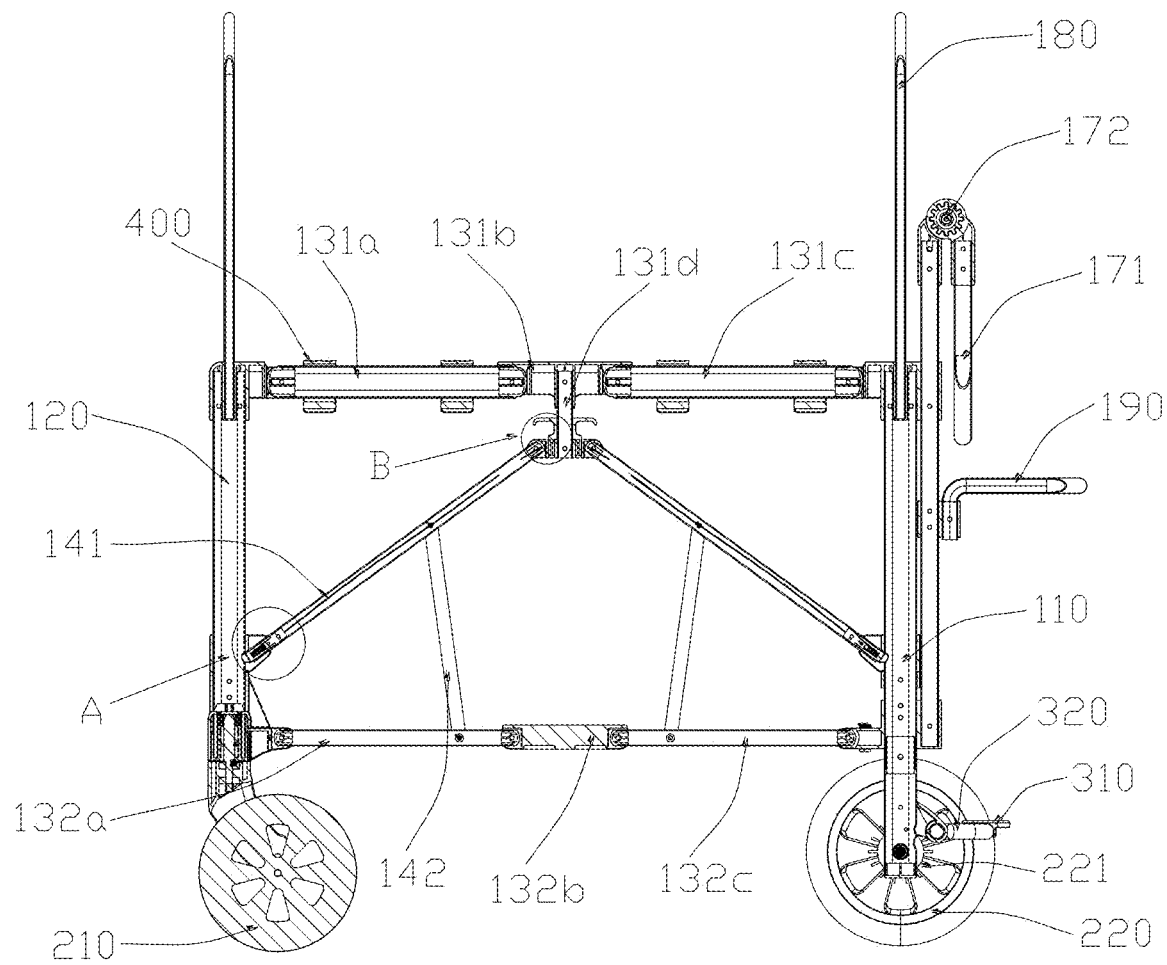
FIG. 4 is a schematic diagram of a sectional structure according to Embodiment I of the present invention.
Figure 5:
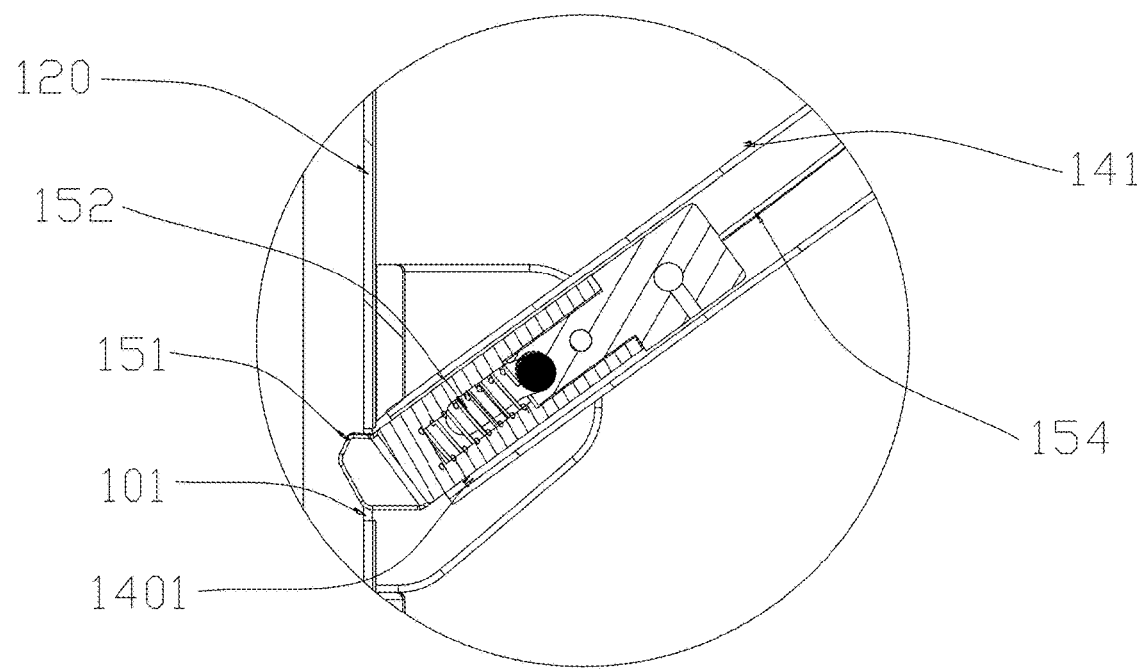
FIG. 5 is an enlarged diagram of an area circled as A in FIG. 4.
Figure 6:
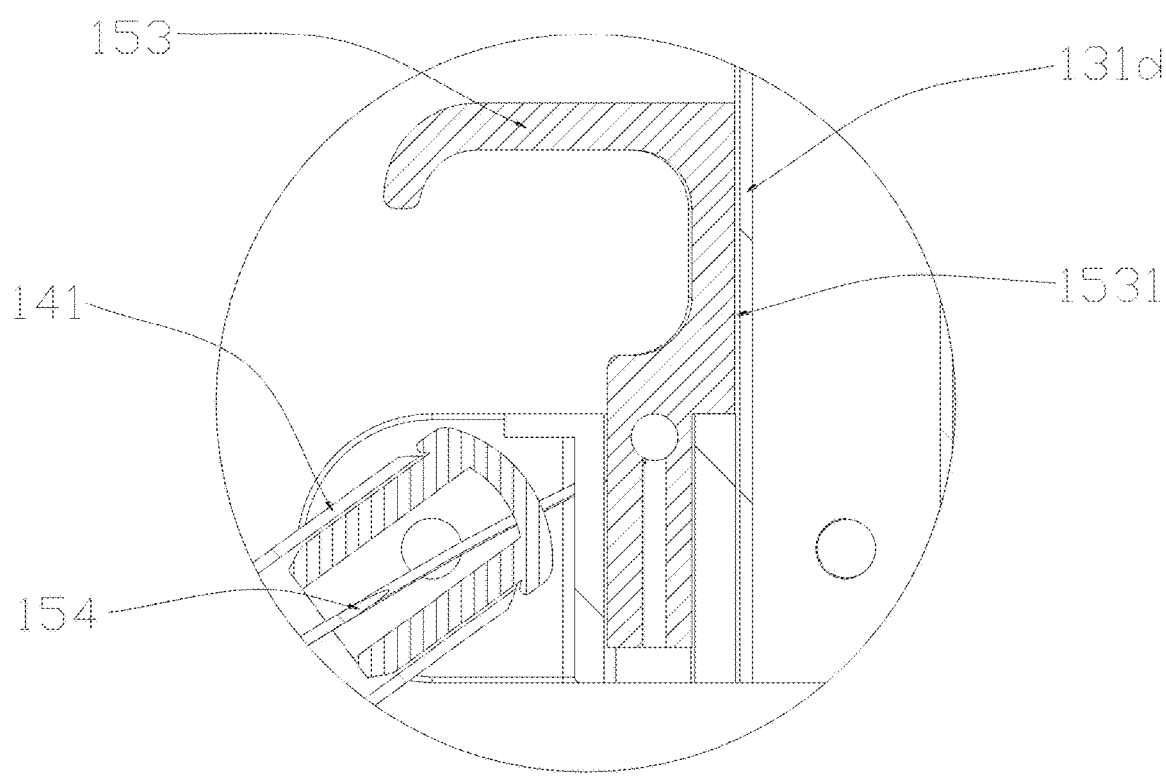
FIG. 6 is an enlarged diagram of an area circled as B in FIG. 4.
Figure 7:
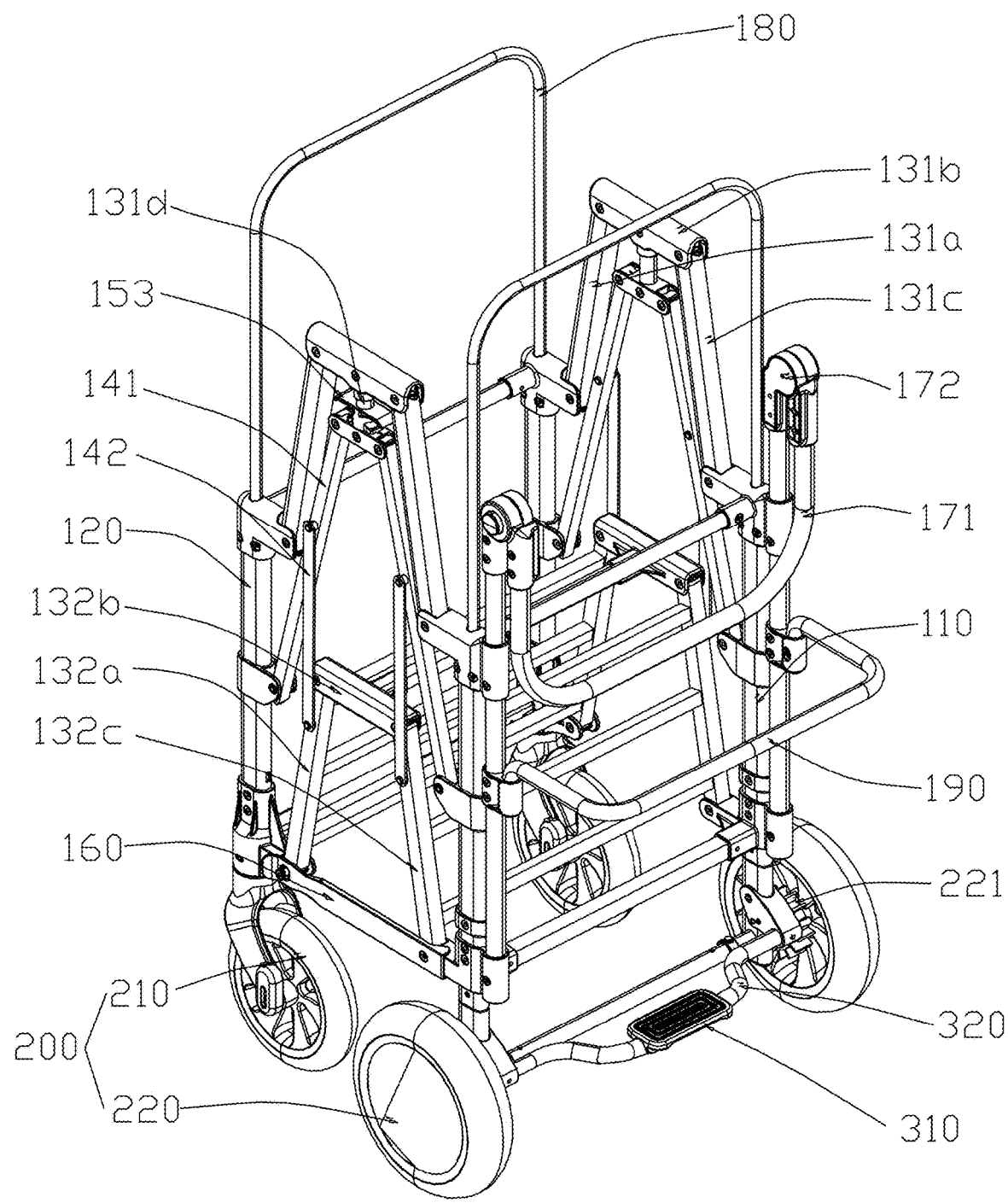
FIG. 7 is a schematic structural diagram in a folded state according to Embodiment I of the present invention.
Figure 8:
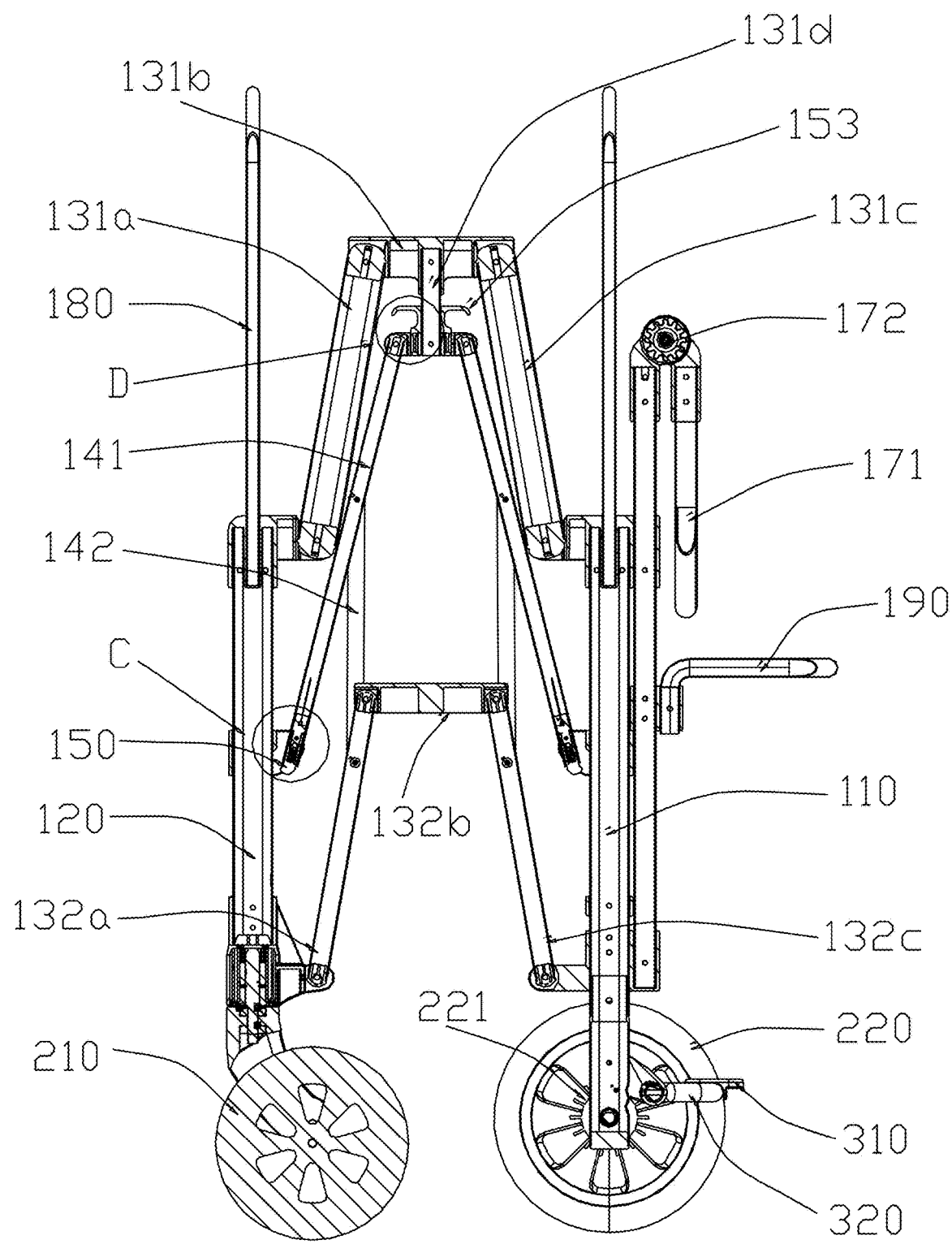
FIG. 8 is a sectional diagram in the folded state according to Embodiment I of the present invention.
Figure 9:
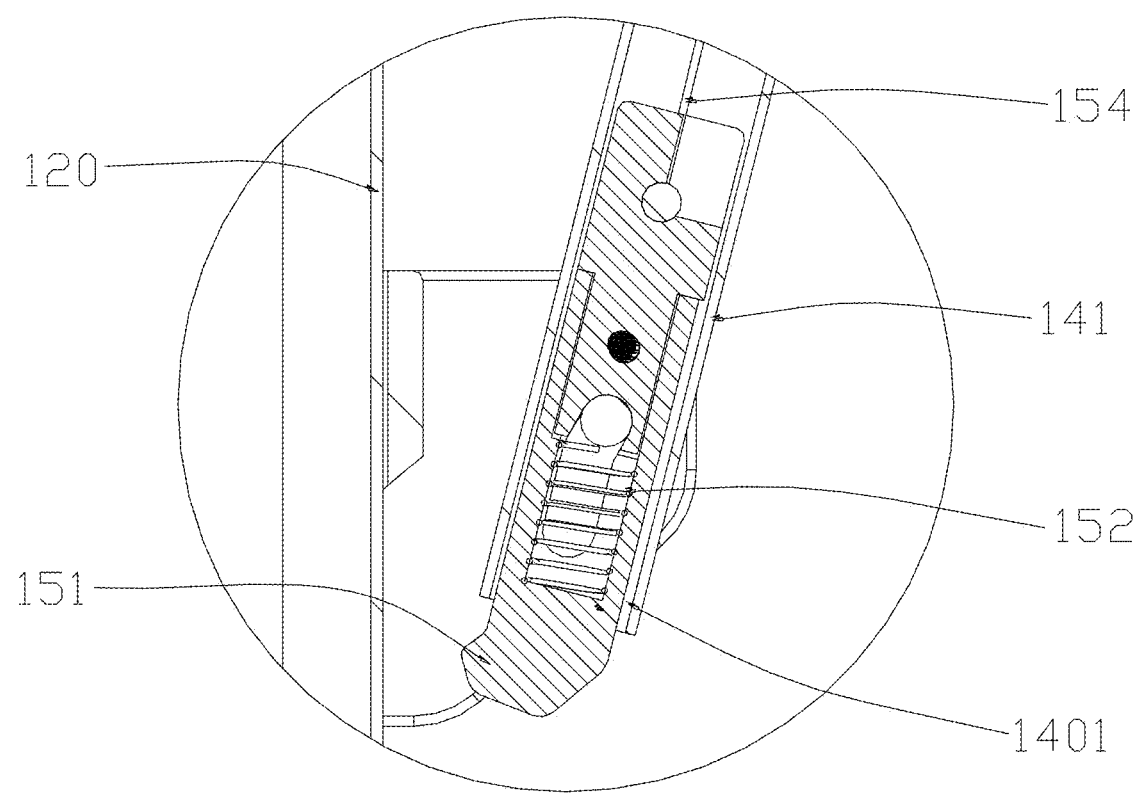
FIG. 9 is an enlarged diagram of an area circled as C in FIG. 8.
Figure 10:
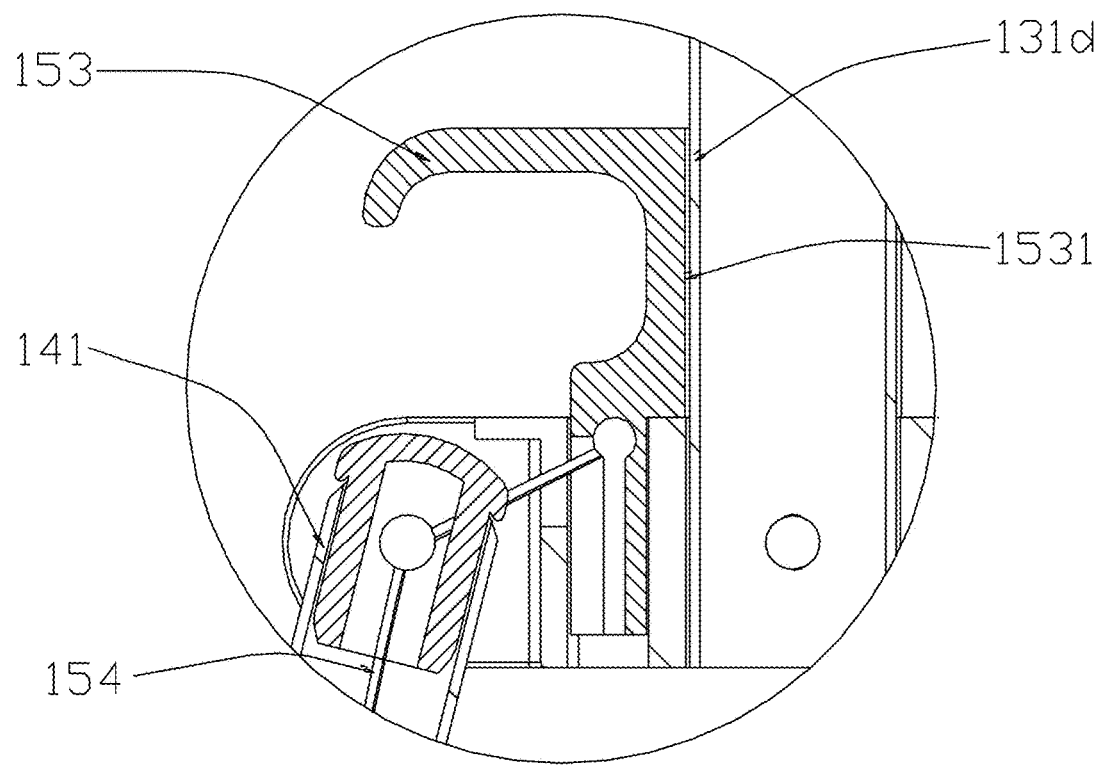
FIG. 10 is an enlarged diagram of an area circled as D in FIG. 8.
Figure 11:
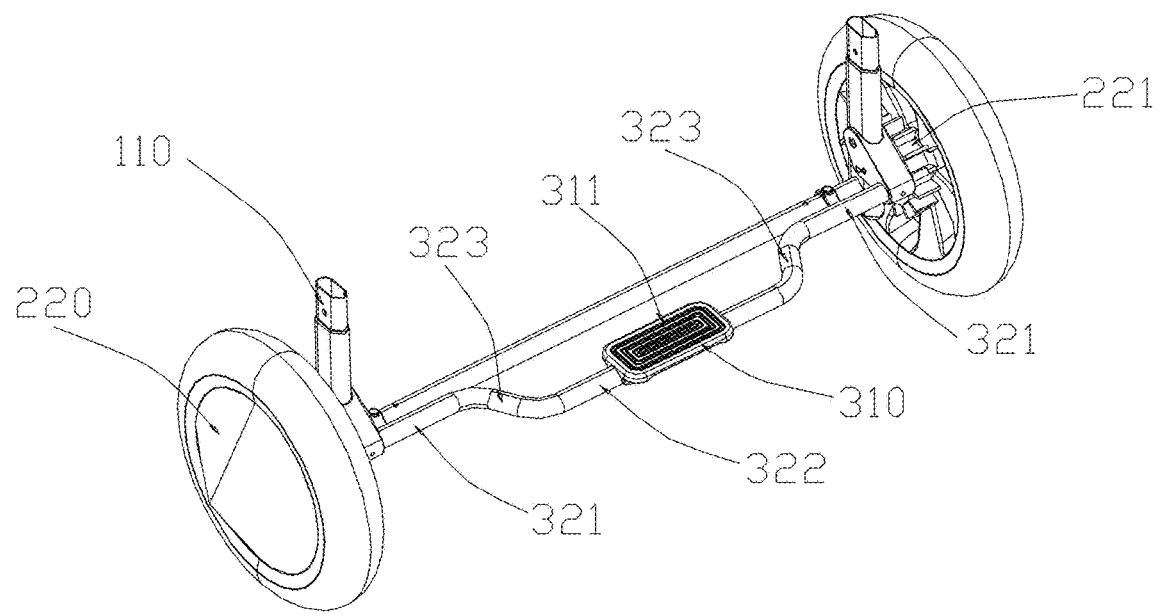
FIG. 11 is a partial schematic diagram according to Embodiment I of the present invention.

Referring to FIG. 1 to FIG. 11, a foldable stroller includes a frame 100 and wheels 200 installed at a bottom of the frame 100, the frame has a folded state and an unfolded state. The frame 100 includes:

a first bracket assembly 110;

a second bracket assembly 120, and the second bracket assembly 120 is arranged opposite to the first bracket assembly 110 in a front-back direction;

a connecting bracket assembly 130, and each of two ends of the connecting bracket assembly 130 is connected to the first bracket assembly 110 and the second bracket assembly 120 respectively; and a supporting assembly 140, a connecting end of the supporting assembly 140 is rotatably connected to the connecting bracket assembly 130, a sliding end of the supporting assembly 140 is slidably connected to the first bracket assembly 110 and the second bracket assembly 120.

When the frame 100 changes between the folded state and the unfolded state, the connecting end of the supporting assembly 140 rotates relative to the connecting bracket assembly 130, the sliding end of the supporting assembly 140 slides along the first bracket assembly 110 and the second bracket assembly 120, and the connecting bracket assembly 130 rotates relative to the first bracket assembly 110 and the second bracket assembly 120.

Through the arrangement of the above structure, when the product is being stored, the first bracket assembly 110 and the second bracket assembly 120 move closer to each other. The connecting end of the supporting assembly 140 rotates relative to the connecting bracket assembly 130, and the sliding end of the supporting assembly 140 slides upward along the first bracket assembly 110 and the second bracket assembly 120 until the frame 100 is in the folded position. At this time, the frame 100 covers a small floor area and can be conveniently stored and transported. When the product is in use, the first bracket assembly 110 and the second bracket assembly 120 move away from each other. The connecting end of the supporting assembly 140 rotates relative to the connecting bracket assembly 130, and the sliding end of the supporting assembly 140 slides downward along the first bracket assembly 110 and the second bracket assembly 120 until the frame 100 is in the unfolded position. At this time, a cuboid-like accommodating space is formed among the first bracket assembly 110, the second bracket assembly 120 and the connecting bracket assembly 130. Meanwhile, the supporting assembly 140 is connected to the first bracket assembly 110, the second bracket assembly 120 and the connecting bracket assembly 130 at the same time, which makes the product structure more stable and enhances the product strength.

In this embodiment, the foldable stroller further includes a locking assembly 150, the locking assembly 150 is arranged at the sliding end of the supporting assembly 140 and moves between the locked position and the unlocked position. A locking hole 101 is arranged on the first bracket assembly 110 and/or the second bracket assembly 120. When the frame 100 is in the unfolded state, the locking assembly 150 moves to the locked position, and at this time, the locking assembly 150 is inserted into the locking hole 101. Through the arrangement of the above structure, when in use, adjust the frame 100 to the unfolded state. The locking assembly 150 moves to the locked position and is inserted into the locking hole 101, which can effectively prevent the relative sliding between the sliding end of the supporting assembly 140 and the first bracket assembly 110 and/or the second bracket assembly 120. Consequently, the frame 100 is fixed in the unfolded state, enhancing the stability of the product and ensuring the safety during its use. While when the locking assembly 150 moves to the unlocked position and is detached from the locking hole 101, the sliding end of the supporting assembly 140 can slide along the first bracket assembly 110 and/or the second bracket assembly 120, thus allowing the frame 100 to change to the folded state for convenient storage and transportation.

In this embodiment, the locking assembly 150 includes a locking block 151 and an elastic member 152, the sliding end of the supporting assembly 140 is provided with a locking block groove 1401, the locking block 151 is slidably arranged within the locking block groove 1401, the elastic member 152 is arranged within the locking block groove 1401 and abuts against the locking block 151, and the elastic member 152 drives the locking block 151 to move towards the locked position. Through the arrangement of the above structure, the elastic potential energy of the elastic member 152 can drive the locking block 151, enabling the locking block 151 to have a tendency to move towards the locked position. When the frame 100 is in the unfolded position, the locking block 151 is directly opposite to the locking hole 101. Under the action of the elastic member 152, the locking block 151 is inserted into the locking hole 101 to fix the sliding end of the supporting assembly 140 with the first bracket assembly 110 and/or the second bracket assembly 120, thus enhancing the stability of the product and ensuring the safety during its use. When the frame 100 moves away from the unfolded position, the locking block 151 is detached from the locking hole 101. The locking block 151 abuts against and slides along the outer surfaces of the first bracket assembly 110 and/or the second bracket assembly 120, which allows the frame 100 to change to the folded state for convenient storage and transportation.

In this embodiment, the locking assembly 150 further includes a driving member 153 and a transmission rope 154. The driving member 153 is arranged on one side of the connecting bracket assembly 130 adjacent to the connecting end of the supporting assembly 140, one end of the transmission rope 154 is connected to the driving member 153, and the other end of the transmission rope 154 extends along a part of an inside of the supporting assembly 140 to the sliding end of the supporting assembly 140 and is connected to the locking block 151. Through the arrangement of the above structure, when in use, the user can move the driving member 153, which will drive the transmission rope 154 and then drive the locking block 151. First, this makes the locking block 151 move towards the unlocked position. Subsequently, the locking block 151 is detached from the locking hole 101, thus realizing the unlocking action. Consequently, it allows the frame 100 to change from the unfolded state to the folded state, facilitating the user's operation. In this embodiment, the user can grasp the middle part of the supporting assembly 140 positioned on the upper side with the palm of the hand, and hook the driving member 153 with the fingers and then move it, so that single-hand unlocking can be achieved, which is convenient for the user to fold and store the product.

In this embodiment, the connecting bracket assembly 130 includes an upper connecting bracket assembly 131 and a lower connecting bracket assembly 132, each of two ends of the upper connecting bracket assembly 131 is connected to an upper end of the first bracket assembly 110 and an upper end of the second bracket assembly 120 respectively, and each of two ends of the lower connecting bracket assembly 132 is connected to a lower end of the first bracket assembly 110 and a lower end of the second bracket assembly 120 respectively. Through the arrangement of the above structure, the upper connecting bracket assembly 131 and the lower connecting bracket assembly 132 cooperate with the first bracket assembly 110 and the second bracket assembly 120 to form the main part of the frame 100. A cuboid-like accommodating space is formed among the first bracket assembly 110, the second bracket assembly 120, the upper connecting bracket assembly 131 and the lower connecting bracket assembly 132, which can allow infants and toddlers to sit or lie in the accommodating space. Moreover, the upper connecting bracket assembly 131 is connected to the upper ends of the first bracket assembly 110 and the second bracket assembly 120, and the lower connecting bracket assembly 132 is connected to the lower ends of the first bracket assembly 110 and the second bracket assembly 120. Thus, the first bracket assembly 110 and the second bracket assembly 120 bear forces evenly up and down, and the product has strong stability.

In this embodiment, the upper connecting bracket assembly 131 includes a first rod 131a, a second rod 131b and a third rod 131c, a first end of the first rod 131a is rotatably connected to the upper end of the first bracket assembly 110, a first end of the third rod 131c is rotatably connected to the upper end of the second bracket assembly 120, and each of two ends of the second rod 131b is rotatably connected to a second end of the first rod 131a and a second end of the third rod 131c respectively. Through the arrangement of the above structure, the first rod 131a, the second rod 131b and the third rod 131c are rotatably connected in sequence. When the frame 100 is in the unfolded position, the first rod 131a, the second rod 131b and the third rod 131c are in a straight line, forming a stable, linear upper connecting bracket assembly 131, which effectively connects the upper end of the first bracket assembly 110 and the upper end of the second bracket assembly 120. While when the frame 100 changes to the folded state, the second rod 131b translates upward, and the first rod 131a and the third rod 131c rotate relative to the second rod 131b. An isosceles trapezoid-like structure is formed among the first rod 131a, the second rod 131b and the third rod 131c, which can make the first bracket assembly 110 and the second bracket assembly 120 move closer to each other. Thus, the frame 100 covers a small floor area and can be conveniently stored and transported.

In this embodiment, the lower connecting bracket assembly 132 includes a fourth rod 132a, a fifth rod 132b and a sixth rod 132c, a first end of the fourth rod 132a is rotatably connected to the lower end of the first bracket assembly 110, a first end of the sixth rod 132c is rotatably connected to the lower end of the second bracket assembly 120, and each of two ends of the fifth rod 132b is rotatably connected to a second end of the fourth rod 132a and a second end of the sixth rod 132c respectively. Through the arrangement of the above structure, the fourth rod 132a, the fifth rod 132b and the sixth rod 132c are rotatably connected in sequence. When the frame 100 is in the unfolded position, the fourth rod 132a, the fifth rod 132b and the sixth rod 132c are in a straight line, forming a stable, linear lower connecting bracket assembly 132, which effectively connects the lower end of the first bracket assembly 110 and the lower end of the second bracket assembly 120. While when the frame 100 changes to the folded state, the fifth rod 132b translates upward, and the fourth rod 132a and the sixth rod 132c rotate relative to the fifth rod 132b. An isosceles trapezoid-like structure is formed among the fourth rod 132a, the fifth rod 132b and the sixth rod 132c, which can make the first bracket assembly 110 and the second bracket assembly 120 move closer to each other. Thus, the frame 100 covers a small floor area and can be conveniently stored and transported.

In this embodiment, a middle part of the second rod 131b extends downward to form a connecting rod 131d, the driving member 153 is in a T-shape and is provided with a sliding channel 1531, and the connecting rod 131d is inserted into the sliding channel 1531, thus the driving member 153 is able to slide along the connecting rod 131d. Through the arrangement of the above structure, when in use, the connecting rod 131d is inserted into the sliding channel 1531. The user can hold or abut the upper part of the second rod 131b with the palm of the hand, and hook the upper part of the T-shaped driving member 153 with fingers, which enables the driving member 153 to slide upward and facilitates the user to unlock. When the frame 100 is in the unfolded position and the user releases the driving member 153, the elastic member 152 drives the locking block 151 to reset and be inserted into the locking hole 101. Subsequently, the driving member 153 is driven to reset through the transmission rope 154. The cooperation between the sliding channel 1531 and the connecting rod 131d enables the driving member 153 to reset to the initial position more stably.

In this embodiment, the supporting assembly 140 includes two first supporting assemblies 141, each of connecting ends of the two first supporting assemblies 141 is rotatably connected to the connecting rod 131d, and each of sliding ends of the two first supporting assemblies 141 is slidably connected to the first bracket assembly 110 and the second bracket assembly 120 respectively. Through the arrangement of the above structure, the connecting ends of the first supporting assemblies 141 are connected to the connecting rod 131d, and the sliding ends of the first supporting assemblies 141 are connected to the first bracket assembly 110 and/or the second bracket assembly 120. The first supporting assemblies 141 are obliquely arranged between the upper connecting bracket assembly 131, the first bracket assembly 110 and the second bracket assembly 120, which can stably support the upper connecting bracket assembly 131, the first bracket assembly 110 and the second bracket assembly 120, improving the stability of the product. Moreover, the connecting ends of the first supporting assemblies 141 can rotate relative to the connecting rod 131d, and the sliding ends of the first supporting assemblies 141 can slide along the first bracket assembly 110 and the second bracket assembly 120, which allows the frame 100 to be deformed into the folded state, facilitating the user to store the product.

In this embodiment, the supporting assembly 140 further includes two second supporting assemblies 142, each of first ends of the two second supporting assemblies 142 is rotatably connected to middle parts of the two first supporting assemblies 141 respectively, and each of second ends of the two second supporting assemblies 142 is rotatably connected to the fourth rod 132a and the sixth rod 132c respectively. Through the arrangement of the above structure, the first ends of the second supporting assemblies 142 are connected to the middle parts of the first supporting assemblies 141, and the second ends of the second supporting assemblies 142 are connected to the fourth rod 132a and the sixth rod 132c. This can support the first supporting assemblies 141 and the lower connecting bracket assembly 132, further improving the stability of the product and making the product more solid and durable. Meanwhile, it enables the upper connecting bracket assembly 131 and the lower connecting bracket assembly 132 to deform synchronously when the frame 100 is folded. The user only needs to pull the driving member 153 and pull it upward, which can make the second rod 131b move upward and the fifth rod 132b move upward accordingly, facilitating the user's operation, making it more convenient to fold the frame 100, and ensuring that the product deforms more simply and smoothly.

In this embodiment, the foldable stroller further includes a fixing member 160, a first end of the fixing member 160 is connected to the first bracket assembly 110, a second end of the fixing member 160 is detachably connected to the second bracket assembly 120, when the frame 100 is in the folded state, the second end of the fixing member 160 is connected to the second bracket assembly 120, and when the frame 100 is in the unfolded state, the second end of the fixing member 160 is detached from the second bracket assembly 120. Through the arrangement of the above structure, when in use, adjust the frame 100 to the folded state. At this time, the distance between the first bracket assembly 110 and the second bracket assembly 120 becomes smaller. Connecting the second end of the fixing member 160 to the second bracket assembly 120 can prevent the movement of the first bracket assembly 110 and the second bracket assembly 120 away from each other, and then prevent the frame 100 from changing to the unfolded state, thus improving the stability during the storage and transportation of the product and facilitating the user to store and transport the product. However, detaching the second end of the fixing member 160 from the second bracket assembly 120 allows the frame 100 to change to the unfolded state.

In this embodiment, the foldable stroller further includes a push rod assembly 171 and a locking fastener 172, the push rod assembly 171 is rotatably connected to the first bracket assembly 110, the locking fastener 172 is connected to the push rod assembly 171 and the first bracket assembly 110, and the locking fastener 172 is configured to allow or prevent a relative rotation between the push rod assembly 171 and the first bracket assembly 110. Through the arrangement of the above structure, when in use, by rotating the push rod assembly 171 to make a gripping end of the push rod assembly 171 move away from the first bracket assembly 110 and then moving the locking fastener 172 to fix the push rod assembly 171, it becomes convenient for users to grip the gripping end of the push rod assembly 171 and push or pull the product. Moreover, users can rotate the push rod assembly 171 as needed to adjust the angle between the push rod assembly 171 and the first bracket assembly 110, and further adjust the height of the gripping end of the push rod assembly 171, which can improve the comfort of the product. In this way, a suitable gripping height can be provided for different users, making it more convenient to use. When the push rod assembly 171 is rotated until it is attached to the first bracket assembly 110, the push rod assembly 171 can be effectively stored, reducing the length of the product and facilitating the transportation and storage of the product.

In this embodiment, the wheels 200 include a swivel caster 210 and a fixed caster 220, the swivel caster 210 is connected to a bottom of the second bracket assembly 120, and the fixed caster 220 is connected to a bottom of the first bracket assembly 110. Through the arrangement of the above structure, when in use, the cooperation between the swivel caster 210 and the fixed caster 220 can facilitate users to push the frame 100, making the movement of the product more convenient. Moreover, the swivel caster 210 can rotate around a vertical axis, allowing it to change its orientation. Consequently, user can conveniently change the moving direction of the stroller with simple operation.

In this embodiment, the foldable stroller further includes a locking member 300, the locking member 300 is rotatably connected to the first bracket assembly 110 and moves between a locked position and an unlocked position, a plurality of locking grooves 221 are arranged on an inner side of the fixed caster 220, when the locking member 300 rotates to the locked position, the locking member 300 is inserted into the locking groove 221, and when the locking member 300 rotates to the unlocked position, the locking member 300 is detached from the locking groove 221. Through the arrangement of the above structure, when in use, by rotating the locking member 300 to the locked position, the locking member 300 will then be inserted into the locking groove 221. The locking member 300 can impede the rotation of the fixed caster 220 and further impede the movement of the stroller, allowing the stroller to be stably parked in place and making it safer to use. When the locking member 300 is rotated to the unlocked position, the locking member 300 will be detached from the locking groove 221. At this time, the fixed caster 220 can rotate freely, which facilitates users to push, pull and move the stroller and makes it convenient and labor-saving to move the product.

In this embodiment, the locking member 300 includes a pedal 310 and a locking rod 320 connected to an outside of the pedal 310, and the pedal 310 is configured to allow users to step on or lift it up, the locking rod 320 is inserted into or detached from the locking groove 221. Through the arrangement of the above structure, the pedal 310 is arranged in such a way that it can facilitate users to rotate the locking member 300. When in use, users only need to step on the pedal 310 downward, and then the locking rod 320 will be inserted into the locking groove 221, thus completing the fixation of the fixed caster 220. When it is necessary to unlock the fixed caster 220, users only need to lift the pedal 310 upward. During the operation process, there is no need for users to bend over, and the operation is simple.

In this embodiment, the locking rod 320 includes a locking portion 321 positioned at each of two ends of the locking rod 320, a connecting portion 322 positioned in middle and a curved transition portion 323 positioned between the locking portion 321 and the connecting portion 322, the pedal 310 is connected to the connecting portion 322, the locking portion 321 is inserted into or detached from the locking groove 221, and the transition portion 323 extends outward in a direction away from the first bracket assembly 110. Through the arrangement of the above structure, the curved transition portion 323 can make the connecting portion 322 and the pedal 310 arranged on the connecting portion positioned away from the first bracket assembly 110, increasing the distance between the pedal 310 and the first bracket assembly 110. When users step on or lift the pedal 310, the operation will be easier and simpler. Moreover, it can increase the rotational moment, making it more labor-saving to rotate the locking member 300.

In this embodiment, friction textures are arranged on an upper surface of the pedal. Through the arrangement of the above structure, the friction textures 311 can increase the friction coefficient of the upper surface of the pedal 310. When users step on the pedal 310, the friction between the soles of users' feet and the upper surface of the pedal 310 will be increased, enabling users to step on the pedal 310 downward more easily with simple operation.

In this embodiment, the foldable stroller further includes a plurality of clamping members 400, the clamping member 400 is provided with an opening facing downward, the clamping member 400 is clamped onto the upper connecting bracket assembly 131, and the clamping member 400 is configured to clamp and fix a bushing 500 onto the upper connecting bracket assembly 131. Through the arrangement of the above structure, the clamping member 400 is approximately in a "C" shape. The opening can allow the bushing 500 and the upper connecting bracket assembly 131 to pass through. The clamping member 400 connects the bushing 500 to the upper connecting bracket assembly 131, which can prevent the bushing 500 from slipping off and detaching, thus ensuring the stability of the product.

In this embodiment, the foldable stroller further includes a plurality of supporting members 180, the supporting member 180 is connected to an upper part of the first bracket assembly 110 and/or an upper part of the second bracket assembly 120, and the supporting member 180 is configured to support a shielding cover 600. Through the arrangement of the above structure, when in use, by connecting the shielding cover 600 to the top of the supporting member 180, the shielding cover 600 can be stably connected and fixed, effectively providing shade from the sun and shelter from the rain, thus improving users' usage experience. Preferably, the supporting member 180 is detachably connected to the upper part of the first bracket assembly 110 and/or the upper part of the second bracket assembly 120. When there is no need to use the shielding cover 600, the supporting member 180 can be removed to reduce the volume of the product.

In this embodiment, the foldable stroller further includes a bearing member 190, the bearing member 190 is connected to a middle part of the first bracket assembly 110 and extends in a direction away from the first bracket assembly 110, and the bearing member 190 is configured to bear and support an accommodating bushing 700. Through the arrangement of the above structure, when in use, the accommodating bushing 700 can be connected to the bearing member 190 to form an accommodating space, where sundries such as tissues and umbrellas can be stored. Moreover, the bearing member 190 is arranged at the middle part of the first bracket assembly 110 and extends in a direction away from the first bracket assembly 110. It is located below the push rod assembly 171, which will not increase the lateral volume of the product. It can make rational use of the space below the push rod assembly 171 and is closer to users, facilitating users to take and store items.

Embodiment II

Figure 12:
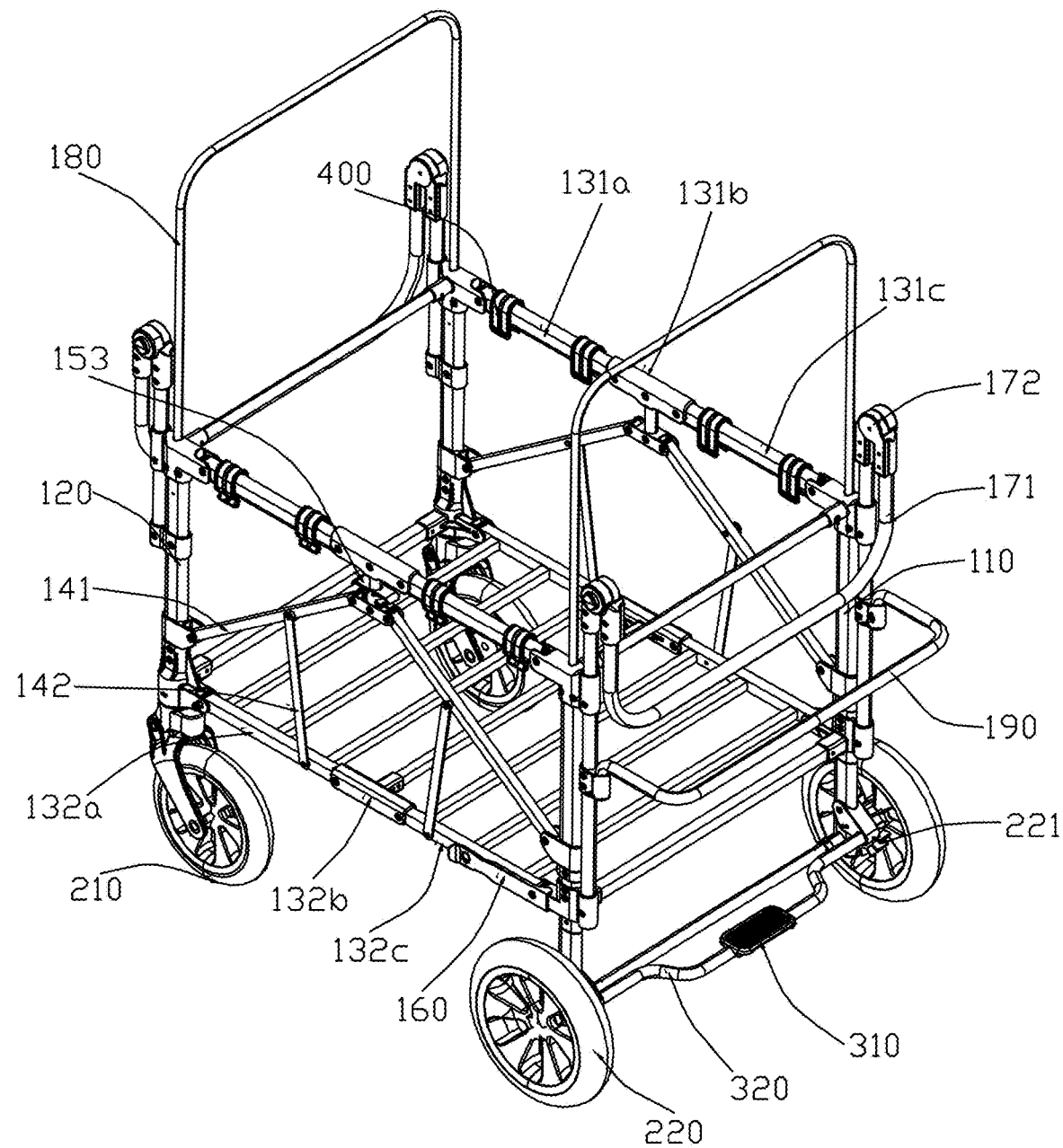
FIG. 12 is a schematic structural diagram according to Embodiment II of the present invention.
Figure 13:
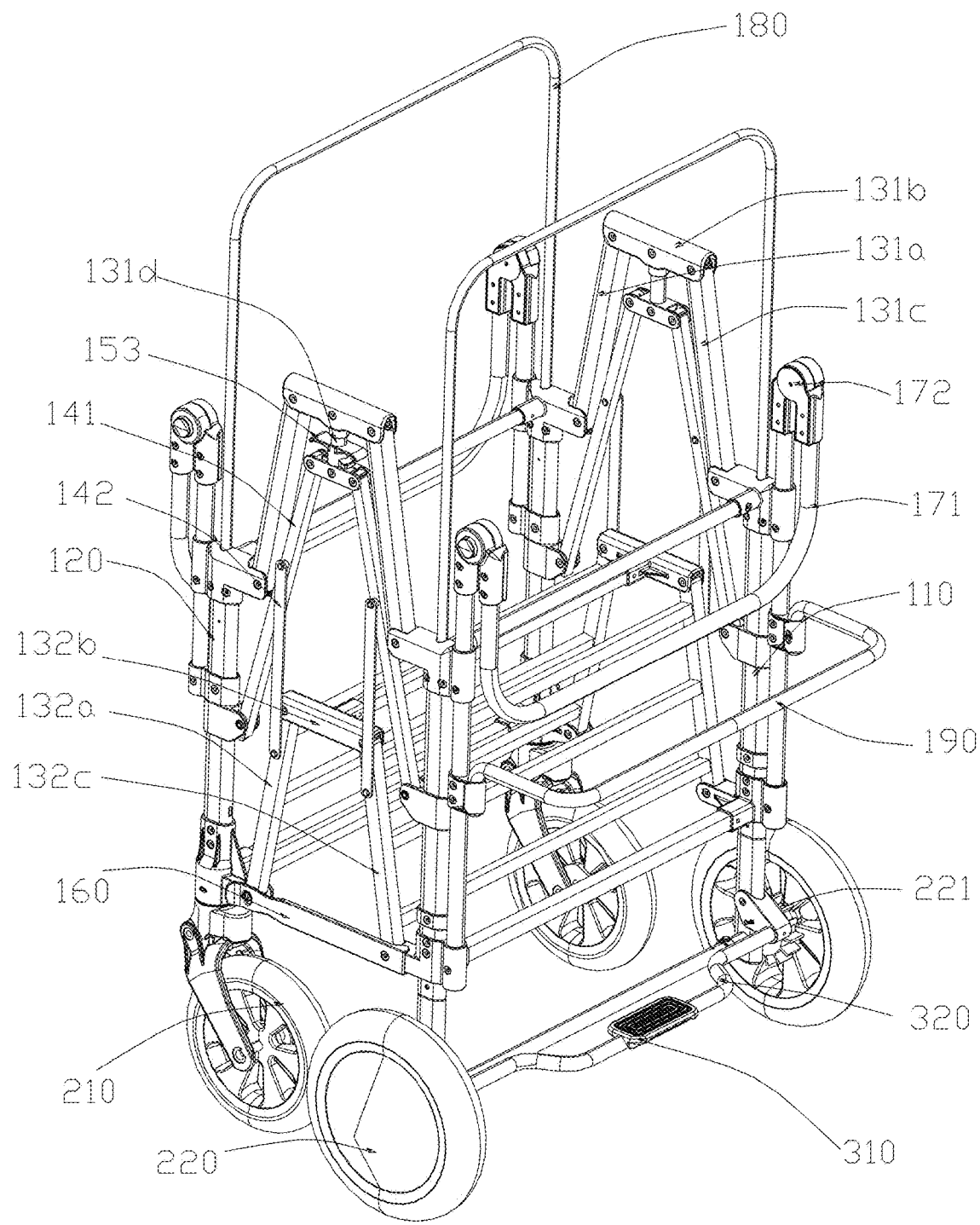
FIG. 13 is a schematic structural diagram in a folded state according to Embodiment II of the present invention.
Figure 14:
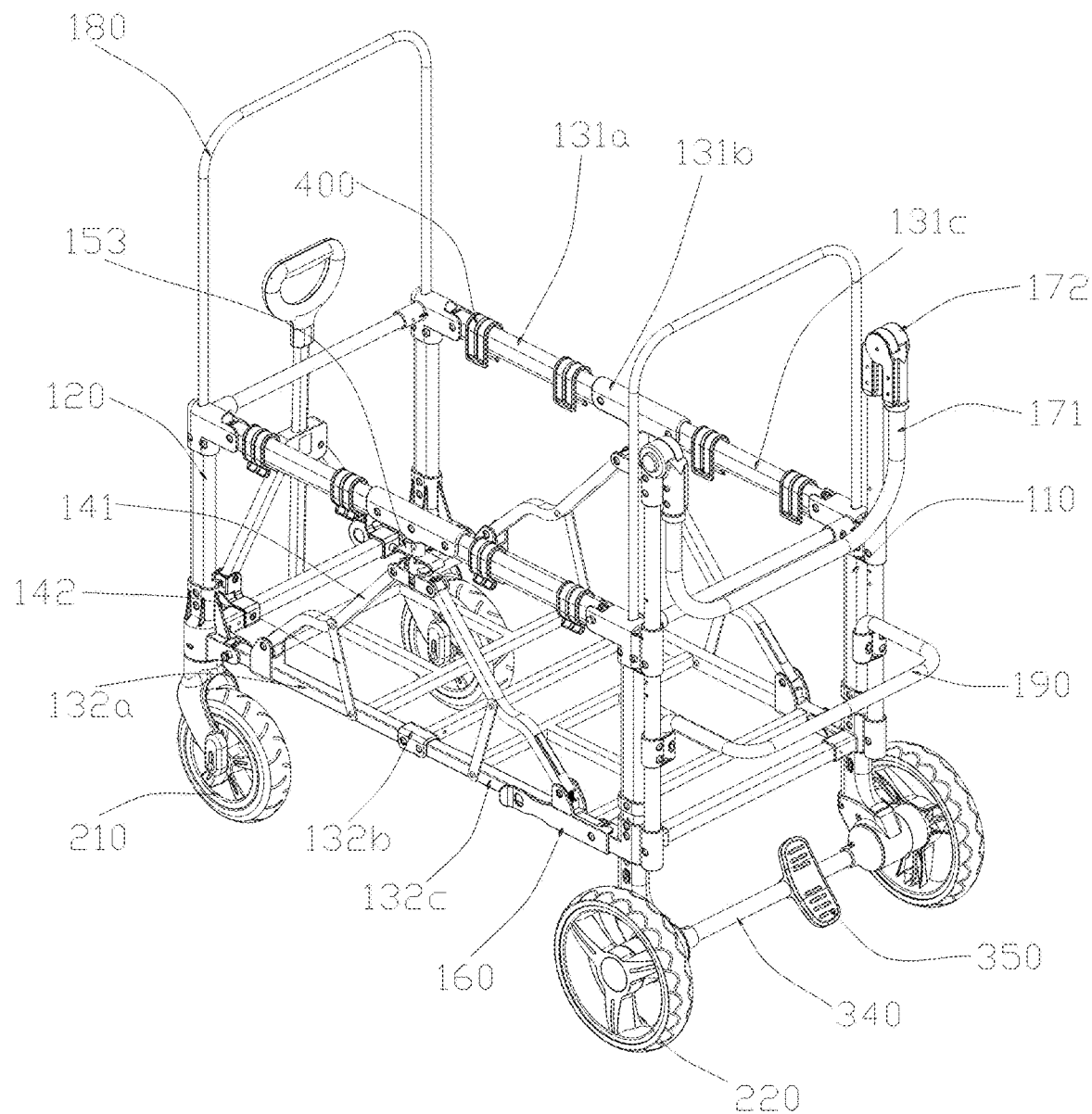
FIG. 14 is a schematic structural diagram in an unfolded state according to Embodiment III of the present invention.
Figure 15:
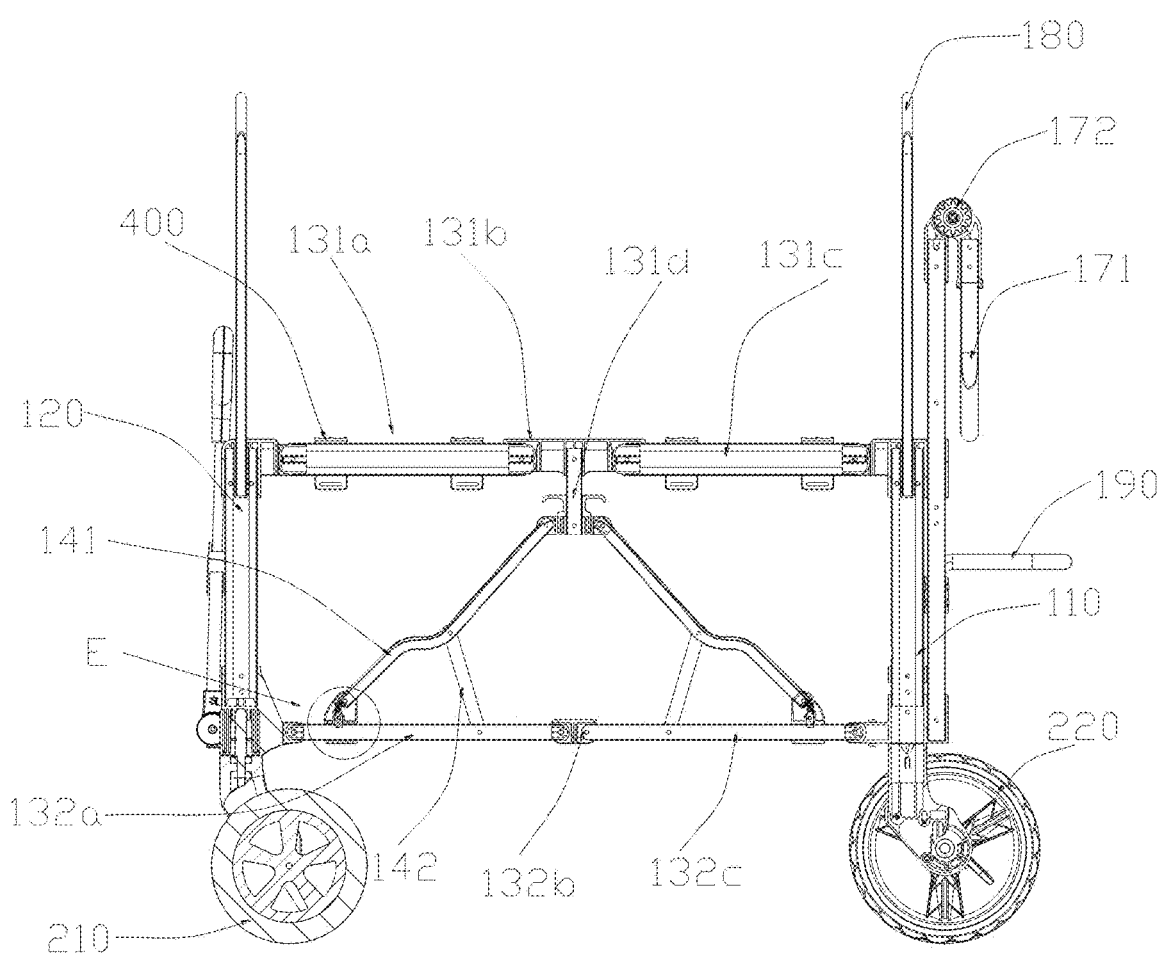
FIG. 15 is a sectional diagram in the unfolded state according to Embodiment III of the present invention.
Figure 16:
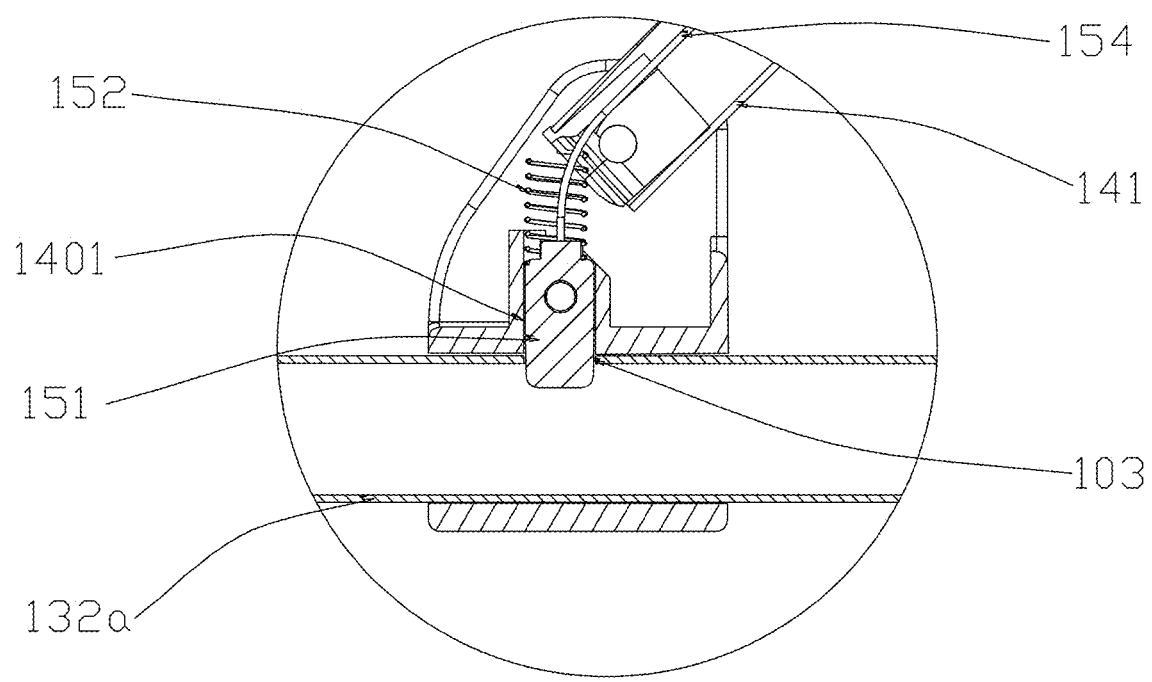
FIG. 16 is an enlarged diagram of an area circled as E in FIG. 15.
Figure 17:
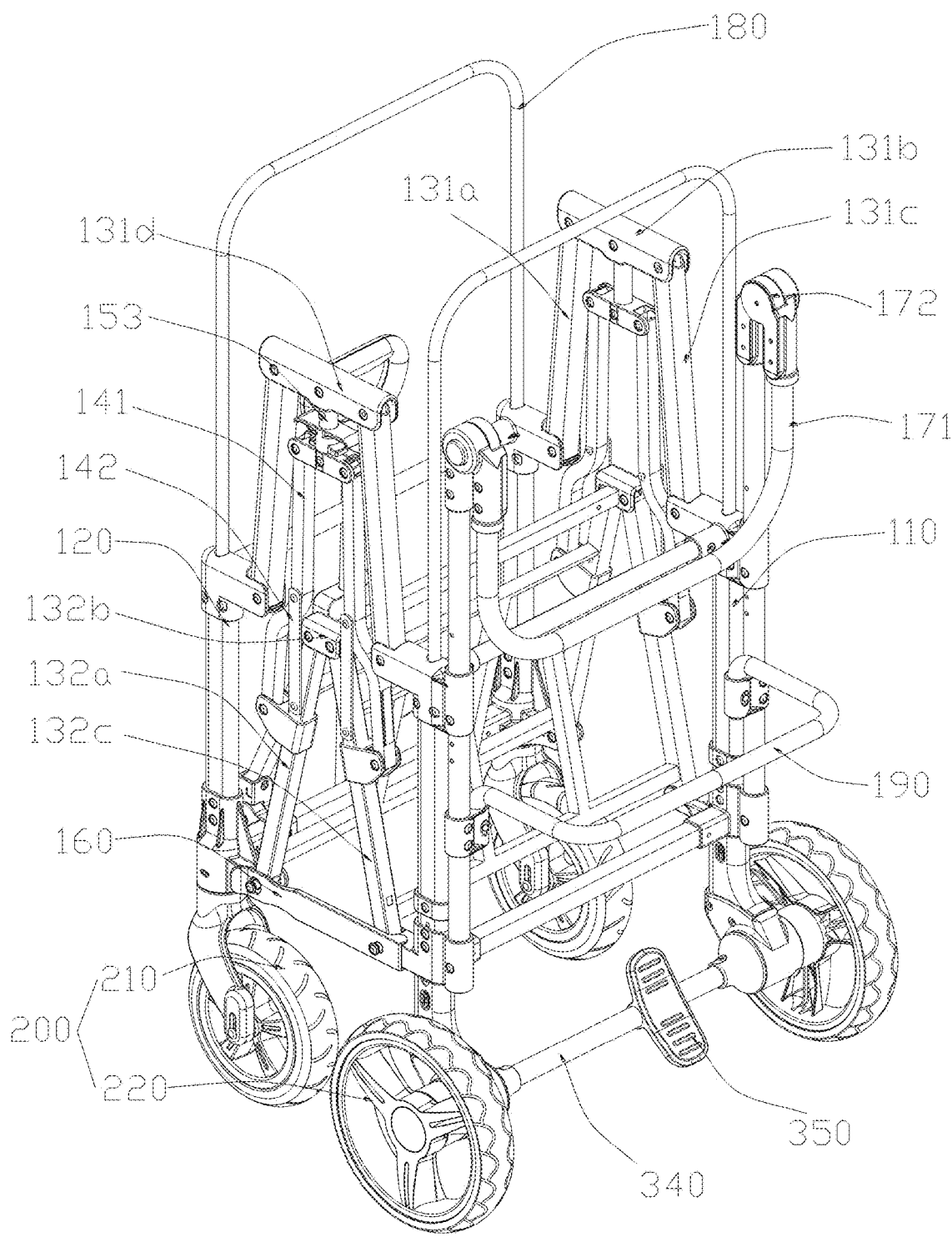
FIG. 17 is a schematic structural diagram in a folded state according to Embodiment III of the present invention.
Figure 18:
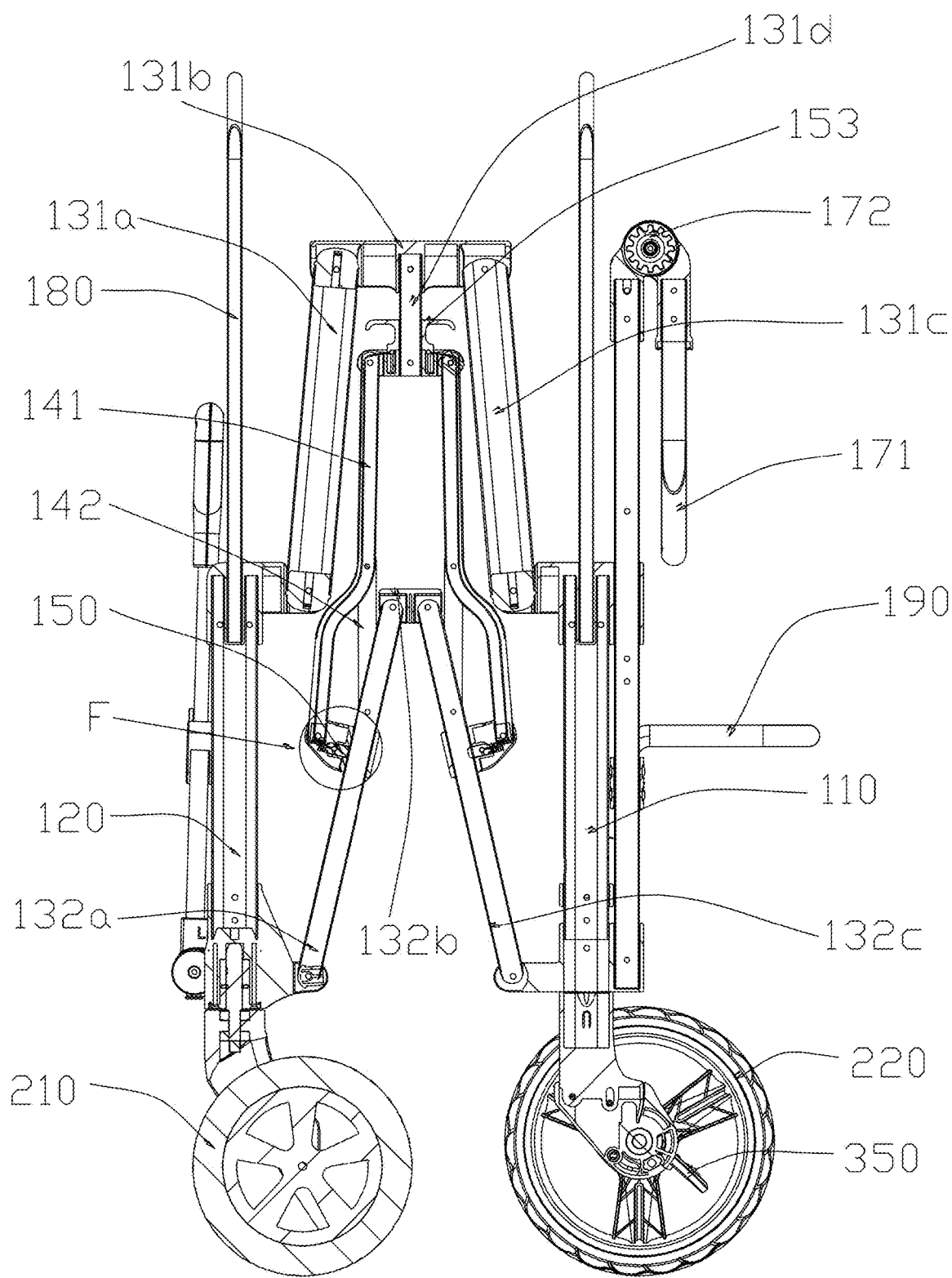
FIG. 18 is a sectional diagram in the folded state according to Embodiment III of the present invention.
Figure 19:
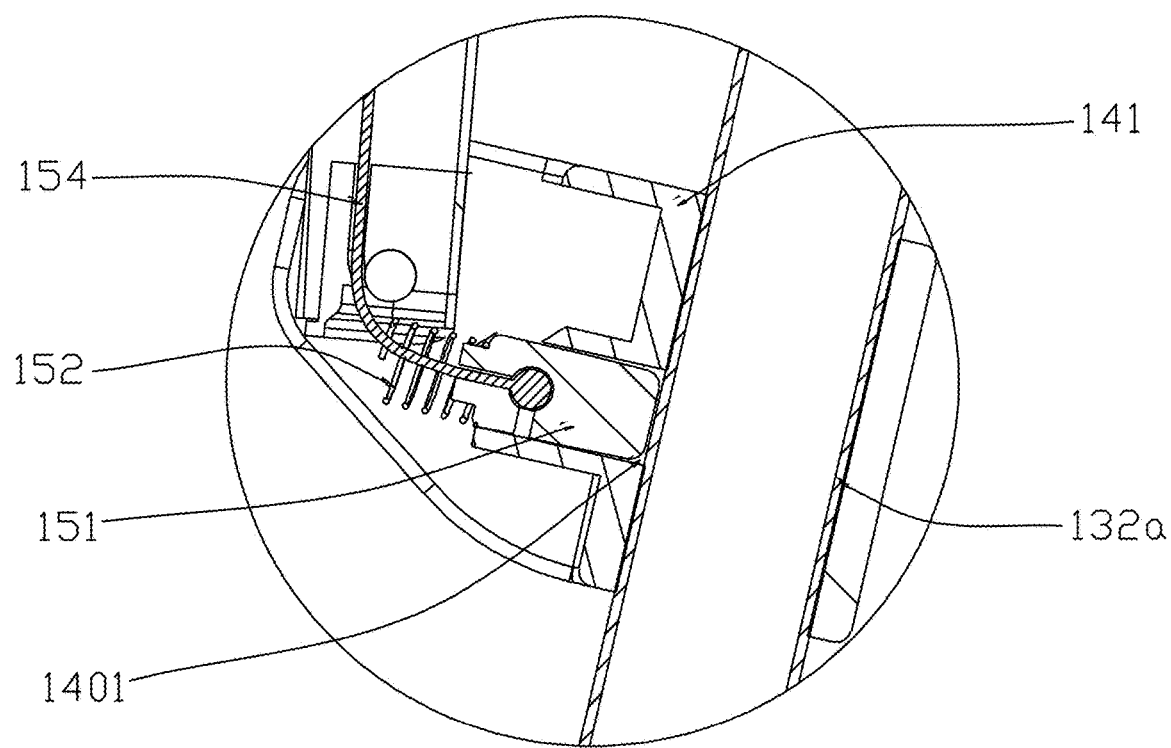
FIG. 19 is an enlarged diagram of an area circled as F in FIG. 18.
Figure 20:
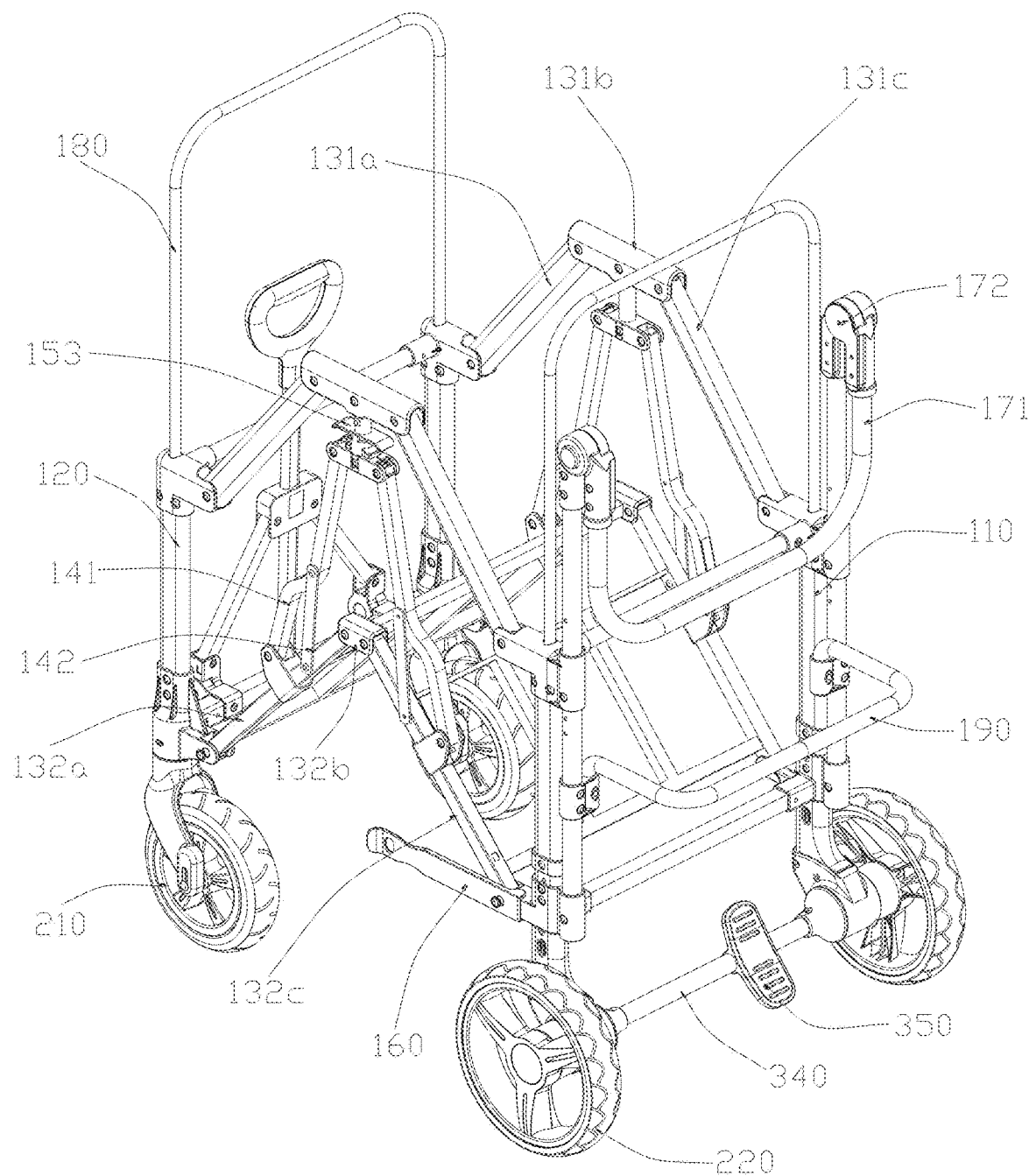
FIG. 20 is a schematic structural diagram in an intermediate state according to Embodiment III of the present invention.

Referring to FIG. 12 to FIG. 13, this embodiment discloses a foldable stroller, and its main structure is basically the same as that of Embodiment I. The main difference between this embodiment and Embodiment I lies in that two push rod assemblies 171 and two locking fasteners 172 are equipped in this embodiment. The two push rod assemblies 171 are rotatably connected to the first bracket assembly 110 and the second bracket assembly 120 respectively. The first ends of the two locking fasteners 172 are connected to the two push rod assemblies 171 respectively, and the second ends of the two locking fasteners 172 are connected to the first bracket assembly 110 or the second bracket assembly 120 respectively. The two locking fasteners 172 are respectively used to allow or prevent the relative rotation between the push rod assemblies 171 and the first bracket assembly 110 or the second bracket assembly 120. Through the arrangement of the above structure, when in use, rotating the push rod assemblies 171 to make the gripping ends of them positioned away from the first bracket assembly 110 and then moving the locking fasteners 172 to fix the push rod assemblies 171 can make it convenient for users to grip the gripping end and push or pull the product. Adjusting the angle between the push rod assemblies 171 and the first bracket assembly 110 by rotating the push rod assemblies 171 according to users' needs can adjust the height of the gripping ends, improving the comfort level of the product and providing a suitable gripping height for different users, thus making it more convenient to use. Storing the push rod assemblies 171 effectively by rotating them until they are attached to the first bracket assembly 110 can reduce the length of the product and facilitate its transportation and storage. Meanwhile, arranging the push rod assemblies 171 at both the front and rear ends enables users to push or pull the product conveniently, and allows the foldable stroller to return along the original route without turning around by using the other push rod assembly 171, which also makes the foldable stroller more convenient to use.

Embodiment III

Referring to FIG. 14 to FIG. 20, this embodiment discloses a foldable stroller. The foldable stroller includes a frame 100 and wheels 200 installed at a bottom of the frame 100, the frame has a folded state and an unfolded state. The frame 100 includes:

a first bracket assembly 110;

a second bracket assembly 120, and the second bracket assembly 120 is arranged opposite to the first bracket assembly 110 in a front-back direction;

a connecting bracket assembly 130, and each of two ends of the connecting bracket assembly 130 is connected to the first bracket assembly 110 and the second bracket assembly 120 respectively; and a supporting assembly 140, a connecting end of the supporting assembly 140 is rotatably connected to the connecting bracket assembly 130, a sliding end of the supporting assembly 140 is slidably connected to the connecting bracket assembly 130.

When the frame 100 changes between the folded state and the unfolded state, the connecting end of the supporting assembly 140 rotates relative to the connecting bracket assembly 130, the sliding end of the supporting assembly 140 slides along the connecting bracket assembly 130, and the connecting bracket assembly 130 rotates relative to the first bracket assembly 110 and the second bracket assembly 120.

The main difference between this embodiment and Embodiment I lies in that the sliding end of the supporting assembly 140 in this embodiment is slidably connected to the connecting bracket assembly 130 instead of being slidably connected to the first bracket assembly 110 and the second bracket assembly 120. When transforming the frame 100 from the folded state to the unfolded state, pull the first bracket assembly 110 and the second bracket assembly 120 outwards to make the first bracket assembly 110 move away from the second bracket assembly 120. The connecting end of the supporting assembly 140 rotates relative to the connecting bracket assembly 130, and the sliding end of the supporting assembly 140 slides along the connecting bracket assembly 130 from the middle part towards the end part until the frame 100 is in the unfolded position. At this time, an accommodating space similar to a cuboid is formed among the first bracket assembly 110, the second bracket assembly 120 and the connecting bracket assembly 130. Moreover, the supporting assembly 140 can effectively define the shape of the connecting bracket assembly 130 and then define the distance between the first bracket assembly 110 and the second bracket assembly 120, making the frame structure stable and enhancing the strength of the product. In addition, the sliding of the sliding end of the supporting assembly 140 along the connecting bracket assembly 130 is smoother, which facilitates users to fold or unfold the product.

In this embodiment, the foldable stroller further includes a locking assembly 150, the locking assembly 150 is arranged at the sliding end of the supporting assembly 140 and moves between the locked position and the unlocked position. A locking hole 101 is arranged on the connecting bracket assembly 130. When the frame 100 is in the unfolded state, the locking assembly 150 moves to the locked position, and at this time, the locking assembly 150 is inserted into the locking hole 101. The main difference between this embodiment and Embodiment I lies in that the locking hole 101 in this embodiment is formed on the connecting bracket assembly 130. When users unfold the frame 100, the locking assembly 150 is inserted into the locking hole 101, which can effectively prevent the sliding end of the supporting assembly 140 from sliding horizontally along the connecting bracket assembly 130, and then define the shape of the connecting bracket assembly 130 as well as the distance between the first bracket assembly 110 and the second bracket assembly 120. This makes the product structure stable, prevents the state of the frame 100 from changing when the product is in use or being stored, ensures the stability of the product, and improves the user's experience of using the product.

In this embodiment, the supporting assembly 140 includes two first supporting assemblies 141. The connecting ends of the two first supporting assemblies 141 are rotatably connected to the connecting rod 131d, and the sliding ends of the two first supporting assemblies 141 are slidably connected to the fourth rod 132a and the sixth rod 132c respectively. The main difference between this embodiment and Embodiment I lies in that the sliding ends of the two first supporting assemblies 141 in this embodiment are slidably connected to the fourth rod 132a and the sixth rod 132c respectively, instead of being slidably connected to the first bracket assembly 110 and the second bracket assembly 120. The sliding ends of the first supporting assemblies 141 slide along the fourth rod 132a and the sixth rod 132c, and the connection is simpler. Moreover, the included angles between the first supporting assemblies 141 and the fourth rod 132a or the sixth rod 132c are smaller, making the sliding easier and facilitating users to change the state of the frame 100, which is simple to use. Preferably, the lower parts of the first supporting assemblies 141 are arranged in a curved shape, so that there are gaps between the lower parts of the first supporting assemblies 141 and the second supporting assemblies 142 and the fourth rod 132a or the sixth rod 132c, allowing users' hands to pass through the gaps and pull the curved lower parts of the first supporting assemblies 141 outwards, which facilitates users to transform the frame 100 from the folded state to the unfolded state. It is more convenient for users to use, and the appearance of the product is also more aesthetically pleasing.

In this embodiment, the foldable stroller further includes an axle rod 340 and a pedal 350. The axle rod 340 is connected to the first bracket assembly 110 and is positioned between the two fixed casters 220. The pedal 350 is arranged in the middle of the axle rod 340. A locking tongue is arranged on each of two ends of the axle rod 340, and a locking hole is arranged on the fixed caster 220. The pedal 350 rotates under an action of external force to drive the axle rod 340 to rotate, so that the locking tongue can be locked into or detached from the locking hole. The main difference between this embodiment and Embodiment I lies in that the pedal 350 in this embodiment is arranged on the axle rod 340, and the axle rod 340 is coaxially arranged with the two fixed casters 220, instead of the locking rod 320 with a curved middle part in Embodiment I. The locking tongue and the locking hole are arranged on the ends of the axle rod 340 and within the housings on the inner sides of the fixed casters 220, which can effectively hide the locking tongue and the locking hole, prevent external debris from affecting the locking tongues being locked into or detached from the locking holes, and ensure the stability of the product.

The other structures of this embodiment are basically the same as those of Embodiment I, and the effects that can be achieved are basically consistent. Thus, they will not be elaborated here.

One or more implementation modes are provided above in combination with specific contents, and it is not deemed that the specific implementation of the present invention is limited to these specifications. Any technical deductions or replacements approximate or similar to the method and structure of the present invention or made under the concept of the present invention shall fall within the scope of protection of the present invention.

The invention claimed is:

1. A foldable stroller, comprising:
a frame; and
wheels installed at a bottom of the frame, wherein the frame has a folded state and an unfolded state, the frame comprises a first bracket assembly;

a second bracket assembly, wherein the second bracket assembly is arranged opposite to the first bracket assembly in a front-back direction;

a connecting bracket assembly, wherein each of two ends of the connecting bracket assembly is connected to the first bracket assembly and the second bracket assembly respectively; and a supporting assembly, wherein a connecting end of the supporting assembly is rotatably connected to the connecting bracket assembly, a sliding end of the supporting assembly is slidably connected to either the first bracket assembly and the second bracket assembly or the connecting bracket assembly;

when the frame changes between the folded state and the unfolded state, the connecting end of the supporting assembly rotates relative to the connecting bracket assembly, the sliding end of the supporting assembly slides along the first bracket assembly and the second bracket assembly or the sliding end of the supporting assembly slides along the connecting bracket assembly, and the connecting bracket assembly rotates relative to the first bracket assembly and the second bracket assembly;

wherein the foldable stroller further comprises a locking assembly, the locking assembly is arranged at the sliding end of the supporting assembly and moves between a locked position and an unlocked position, a locking hole is arranged on the first bracket assembly and/or the second bracket assembly or on the connecting bracket assembly, and when the frame is in the unfolded state, the locking assembly moves to the locked position, at this time, the locking assembly is inserted into the locking hole.

2. The foldable stroller according to claim 1, wherein the locking assembly comprises a locking block and an elastic member, the sliding end of the supporting assembly is provided with a locking block groove, the locking block is slidably arranged within the locking block groove, the elastic member is arranged within the locking block groove and abuts against the locking block, and the elastic member drives the locking block to move towards the locked position.

3. The foldable stroller according to claim 2, wherein the locking assembly further comprises a driving member and a transmission rope, the driving member is arranged on one side of the connecting bracket assembly adjacent to the connecting end of the supporting assembly, one end of the transmission rope is connected to the driving member, and the other end of the transmission rope extends along a part of an inside of the supporting assembly to the sliding end of the supporting assembly and is connected to the locking block.

4. The foldable stroller according to claim 3, wherein the connecting bracket assembly comprises an upper connecting bracket assembly and a lower connecting bracket assembly, each of two ends of the upper connecting bracket assembly is connected to an upper end of the first bracket assembly and an upper end of the second bracket assembly respectively, and each of two ends of the lower connecting bracket assembly is connected to a lower end of the first bracket assembly and a lower end of the second bracket assembly respectively.

5. The foldable stroller according to claim 4, wherein the upper connecting bracket assembly comprises a first rod, a second rod and a third rod, a first end of the first rod is rotatably connected to the upper end of the first bracket assembly, a first end of the third rod is rotatably connected to the upper end of the second bracket assembly, and each of two ends of the second rod is rotatably connected to a second end of the first rod and a second end of the third rod respectively.

6. The foldable stroller according to claim 5, wherein the lower connecting bracket assembly comprises a fourth rod, a fifth rod and a sixth rod, a first end of the fourth rod is rotatably connected to the lower end of the first bracket assembly, a first end of the sixth rod is rotatably connected to the lower end of the second bracket assembly, and each of two ends of the fifth rod is rotatably connected to a second end of the fourth rod and a second end of the sixth rod respectively.

7. The foldable stroller according to claim 6, wherein a middle part of the second rod extends downward to form a connecting rod, the driving member is in a T-shape and is provided with a sliding channel, and the connecting rod is inserted into the sliding channel, thus the driving member is able to slide along the connecting rod.

8. The foldable stroller according to claim 7, wherein the supporting assembly comprises two first supporting assemblies, each of connecting ends of the two first supporting assemblies is rotatably connected to the connecting rod, and each of sliding ends of the two first supporting assemblies is slidably connected to the first bracket assembly and the second bracket assembly respectively or each of sliding ends of the two first supporting assemblies is slidably connected to the fourth rod and the sixth rod respectively.

9. The foldable stroller according to claim 8, wherein the supporting assembly further comprises two second supporting assemblies, each of first ends of the two second supporting assemblies is rotatably connected to middle parts of the two first supporting assemblies respectively, and each of second ends of the two second supporting assemblies is rotatably connected to the fourth rod and the sixth rod respectively.

10. The foldable stroller according to claim 1, wherein the foldable stroller further comprises a fixing member, a first end of the fixing member is connected to the first bracket assembly, a second end of the fixing member is detachably connected to the second bracket assembly, when the frame is in the folded state, the second end of the fixing member is connected to the second bracket assembly, and when the frame is in the unfolded state, the second end of the fixing member is detached from the second bracket assembly.

11. The foldable stroller according to claim 1, wherein the foldable stroller further comprises a push rod assembly and a locking fastener, the push rod assembly is rotatably connected to the first bracket assembly, the locking fastener is connected to the push rod assembly and the first bracket assembly, and the locking fastener is configured to allow or prevent a relative rotation between the push rod assembly and the first bracket assembly.

12. The foldable stroller according to claim 1, wherein the wheels comprise a swivel caster and a fixed caster, the swivel caster is connected to a bottom of the second bracket assembly, and the fixed caster is connected to a bottom of the first bracket assembly.

13. The foldable stroller according to claim 12, wherein the foldable stroller further comprises a locking member, the locking member is rotatably connected to the first bracket assembly and moves between a locked position and an unlocked position, a plurality of locking grooves are arranged on an inner side of the fixed caster, when the locking member rotates to the locked position, the locking member is inserted into the locking groove, and when the locking member rotates to the unlocked position, the locking member is detached from the locking groove.

14. The foldable stroller according to claim 13, wherein the locking member comprises a pedal and a locking rod connected to an outside of the pedal, and the pedal is configured to allow users to step on or lift it up, the locking rod is inserted into or detached from the locking groove.

15. The foldable stroller according to claim 14, wherein the locking rod comprises a locking portion positioned at each of two ends of the locking rod, a connecting portion positioned in middle and a curved transition portion positioned between the locking portion and the connecting portion, the pedal is connected to the connecting portion, the locking portion is inserted into or detached from the locking groove, and the transition portion extends outward in a direction away from the first bracket assembly.

16. The foldable stroller according to claim 14, wherein friction textures are arranged on an upper surface of the pedal.

17. The foldable stroller according to claim 3, wherein the foldable stroller further comprises a plurality of clamping members, the clamping member is provided with an opening facing downward, the clamping member is clamped onto the upper connecting bracket assembly, and the clamping member is configured to clamp and fix a bushing onto the upper connecting bracket assembly.

18. The foldable stroller according to claim 1, wherein the foldable stroller further comprises a plurality of supporting members, the supporting member is connected to an upper part of the first bracket assembly and/or an upper part of the second bracket assembly, and the supporting member is configured to support a shielding cover.

19. The foldable stroller according to claim 1, wherein the foldable stroller further comprises a bearing member, the bearing member is connected to a middle part of the first bracket assembly and extends in a direction away from the first bracket assembly, and the bearing member is configured to bear and support an accommodating bushing.

* * * * *